(12) United States Patent
Ono

(10) Patent No.: US 9,695,329 B2
(45) Date of Patent: Jul. 4, 2017

(54) THERMOCHROMIC COLOR-MEMORY COMPOSITION AND THERMOCHROMIC COLOR-MEMORY MICROCAPSULE PIGMENT ENCAPSULATING SAME

(71) Applicant: THE PILOT INK CO., LTD., Aichi-ken (JP)

(72) Inventor: Yoshiaki Ono, Aichi-ken (JP)

(73) Assignee: THE PILOT INK CO., LTD., Aichi-Ken (JP)

( * ) Notice: Subject to any disclaimer, the term of this patent is extended or adjusted under 35 U.S.C. 154(b) by 51 days.

(21) Appl. No.: 14/897,305

(22) PCT Filed: Jun. 12, 2014

(86) PCT No.: PCT/JP2014/065570
§ 371 (c)(1),
(2) Date: Dec. 10, 2015

(87) PCT Pub. No.: WO2014/200053
PCT Pub. Date: Dec. 18, 2014

(65) Prior Publication Data
US 2016/0130455 A1 May 12, 2016

(30) Foreign Application Priority Data

Jun. 14, 2013 (JP) .................................. 2013-125226
Mar. 28, 2014 (JP) .................................. 2014-067383

(51) Int. Cl.
*B41M 5/30* (2006.01)
*B41M 5/337* (2006.01)
(Continued)

(52) U.S. Cl.
CPC .............. *C09D 11/50* (2013.01); *B41M 5/305* (2013.01); *B41M 5/3375* (2013.01); *B43K 7/005* (2013.01);
(Continued)

(58) Field of Classification Search
CPC ..... B41M 5/305; B41M 5/3375; C09D 11/18; C09D 11/50
(Continued)

(56) References Cited

U.S. PATENT DOCUMENTS 4,720,301 A 1/1988 Kito et al.
5,480,482 A 1/1996 Novinson

FOREIGN PATENT DOCUMENTS

EP 0 789 066 8/1997
JP 2005-1369 1/2005
(Continued)

OTHER PUBLICATIONS

International Preliminary Report on Patentability issued Dec. 23, 2015 in corresponding (PCT) Application No. PCT/JP2014/065570.
(Continued)

*Primary Examiner* — Bruce H Hess
(74) *Attorney, Agent, or Firm* — Wenderoth, Lind & Ponack, L.L.P.

(57) ABSTRACT

[Problems] An object of the present invention is to provide: thermochromic color-memory composition which effectively expresses a property of being capable of interchangeably memorizing and retaining colors and is thus applicable to various fields; and thermochromic memory microcapsule pigment encapsulating the same.
[Means for Solution] Provided are thermochromic color-memory composition and thermochromic color-memory microcapsule pigment encapsulating the same, the thermochromic color-memory composition comprising: (a) a component composed of an electron-donating color-developing organic compound; (b) a component composed of an electron-accepting compound; and (c) a reaction medium which comprises an ester compound represented by the following Formula (1) and controls color reaction between the components (a) and (b):
(Continued)

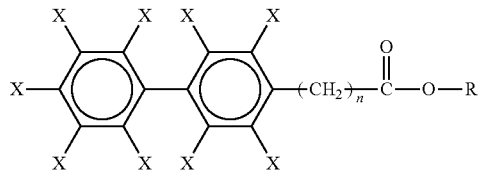

(1)

(wherein, R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms; X represents a hydrogen atom, an alkyl group having 1 to 4 carbon atoms, an alkoxy group having 1 to 4 carbon atoms or a halogen atom; and n represents 0 or 1).

13 Claims, 1 Drawing Sheet

(51) Int. Cl.
| | |
|---|---|
| C09D 11/50 | (2014.01) |
| B43K 8/02 | (2006.01) |
| C09K 9/02 | (2006.01) |
| C09D 11/17 | (2014.01) |
| C09D 11/18 | (2006.01) |
| B43L 19/00 | (2006.01) |
| C09B 11/24 | (2006.01) |
| C09B 67/46 | (2006.01) |
| C09B 67/02 | (2006.01) |
| C09D 11/037 | (2014.01) |
| B43K 7/00 | (2006.01) |

(52) U.S. Cl.
CPC ............ *B43K 8/02* (2013.01); *B43L 19/0025* (2013.01); *C09B 11/24* (2013.01); *C09B 67/009* (2013.01); *C09B 67/0097* (2013.01); *C09D 11/037* (2013.01); *C09D 11/17* (2013.01); *C09D 11/18* (2013.01); *C09K 9/02* (2013.01)

(58) Field of Classification Search
USPC ............................... 503/201, 209; 106/31.23
See application file for complete search history.

(56) References Cited

FOREIGN PATENT DOCUMENTS

| JP | 2006-137886 | 6/2006 |
|---|---|---|
| JP | 2006-188660 | 7/2006 |
| JP | 2011-153321 | 8/2011 |
| JP | 2012-77260 | 4/2012 |
| JP | 2012-102206 | 5/2012 |
| JP | 2012-188648 | 10/2012 |
| JP | 2013-10812 | 1/2013 |
| JP | 2013-52684 | 3/2013 |
| WO | 2012/046837 | 4/2012 |
| WO | 2013/061814 | 5/2013 |

OTHER PUBLICATIONS

Office Action issued Oct. 25, 2016, in corresponding Chinese Application No. 201480033515.X, with English translation.
International Search Report issued Sep. 2, 2014 in International (PCT) Application No. PCT/JP2014/065570.
Extended European Search Report issued Feb. 3, 2017 in corresponding European Application No. 14811391.3.

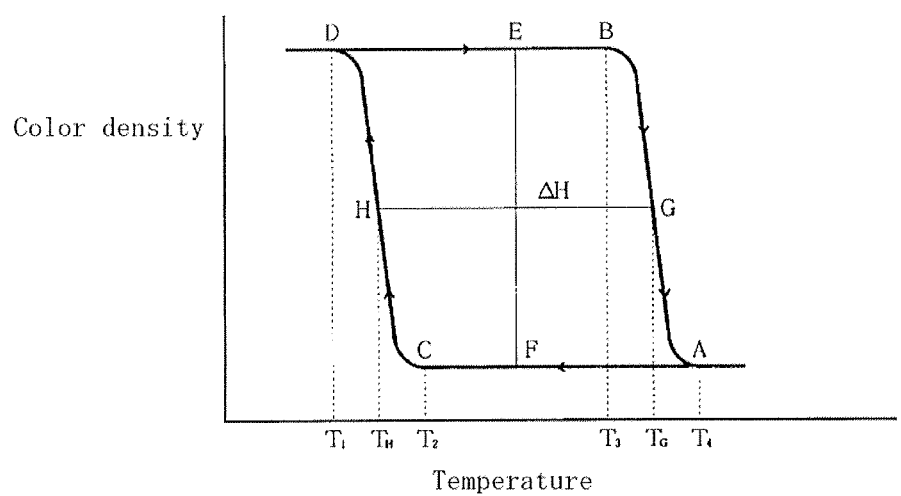

THERMOCHROMIC COLOR-MEMORY COMPOSITION AND THERMOCHROMIC COLOR-MEMORY MICROCAPSULE PIGMENT ENCAPSULATING SAME

BACKGROUND OF THE INVENTION

Field of the Invention

The present invention relates to thermochromic color-memory composition and thermochromic color-memory microcapsule pigment encapsulating the same. More particularly, the present invention relates to: thermochromic color-memory composition which displays reversible discoloration between coloration and decoloration showing prominent hysteresis characteristics according to temperature change and retains either a colored state or a decolored state in an interchangeable and reversible manner even after removal of application of heat or cold required for the discoloration; and thermochromic color-memory microcapsule pigment encapsulating the composition.

Background Art

The present applicant has previously made proposals on thermochromiccolor-memory materials of this kind (see, for example, Patent Documents 1 to 3).

In contrast to reversibly thermochromic materials of a conventional type that change colors across a discoloration temperature, in which only one specific state of those states before and after the discoloration exits in a normal temperature range and the other state is maintained while heat or cold required for the expression of the specific state is being applied but the state in the normal temperature range is restored once the application of heat or cold is terminated, the above-mentioned thermochromic color-memory materials not only are capable of selectively maintaining either a color at the lower temperature side than the discoloration temperature or a color at the higher temperature side than the discoloration temperature in a normal temperature range but also can be made to interchangeably maintain these colors by applying thereto heat or cold as required, and the thermochromic color-memory materials have thus been applied to a wide variety of fields including the fields of thermochromic recording materials, toys, ornaments and printing.

PRIOR ART DOCUMENTS

Patent Documents

[Patent Document 1] Japanese Patent Laid-open Publication No. 2005-1369
[Patent Document 2] Japanese Patent Laid-open Publication No. 2006-137886
[Patent Document 3] Japanese Patent Laid-open Publication No. 2006-188660

SUMMARY OF THE INVENTION

Problems to be Solved by the Invention

The color-memory effect of this kind is expressed only by a system where, among compounds selected from esters, ketones, ethers and the like that control color reaction, specific compounds are applied as constituents. The present invention further searches for a compound functioning as a reaction medium which allows the above-described color-memory effect to be expressed, and an object of the present invention is to improve the freedom in the selection of a reaction medium and thereby further improve the utilization of such a kind of thermochromic color-memory material.

Means for Solving the Problems

The present inventor discovered that, by applying a compound having a specific structure as a reaction medium for color reaction, prominent thermochromic characteristics with a large hysteresis width (hereinafter, indicated as "ΔH") can be displayed and an effective color-memory effect can thus be expressed, thereby completing the present invention.

The present invention relates to thermochromic color-memory composition comprising: (a) a component composed of an electron-donating color-developing organic compound; (b) a component composed of an electron-accepting compound; and (c) a reaction medium which comprises an ester compound represented by the following Formula (1) and controls color reaction between the components (a) and (b) (these components may each be hereinafter referred to as "component (a)", "component (b)" and "component (c)"):

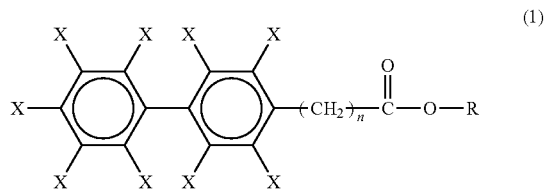

(1)

(wherein, R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms; X represents a hydrogen atom, an alkyl group having 1 to 4 carbon atoms, an alkoxy group having 1 to 4 carbon atoms or a halogen atom; and n represents 0 or 1).

The present invention also relates to thermochromic color-memory microcapsule pigment encapsulating the thermochromic color-memory composition.

Further, the present invention relates to an ink composition comprising the thermochromic color-memory microcapsule pigment.

Still further, the present invention relates to a writing instrument comprising: an axial barrel which stores the ink composition; and a pen body which delivers the ink composition stored in the axial barrel.

Yet still further, the present invention relates to a writing instrument set comprising: the writing instrument; and a friction body.

Effects of the Invention

The thermochromic color-memory microcapsule pigment of the present invention induces reversible discoloration between coloration and decoloration and shows a large hysteresis width (ΔH) upon this reversible discoloration in terms of color density-temperature curve. In addition, this pigment is capable of interchangeably memorizing and retaining both colors at the lower temperature side and higher temperature side than the discoloration temperature and allowed to effectively express a property of reproducing, memorizing and retaining either of these color in a reversible manner by applying thereto heat or cold as required. Therefore, according to the present invention, thermochromic color-memory composition applicable to various fields of temperature indication, ornaments, toys, training and learning elements and the like as well as thermochromic color-memory microcapsule pigment encapsulating the composition are provided.

BRIEF DESCRIPTION OF THE DRAWING

The FIGURE is a graph illustrating the hysteresis characteristics of the thermochromic color-memory composition of the present invention in a color density-temperature curve.

DETAILED DESCRIPTION OF THE INVENTION

Mode for Carrying Out the Invention

The hysteresis characteristics of the thermochromic color-memory composition of the present invention and thermochromic color-memory microcapsule pigment comprising the same (a reversibly thermochromic composition having a color-memory property and a reversibly thermochromic microcapsule pigment having a color-memory property which comprises the same) will now be described based on the graph represented by the color density-temperature curve of FIG. 1.

In the FIGURE, the color density is plotted on the ordinate and the temperature is plotted on the abscissa. A change in the color density due to temperature change occurs along the arrow. Here, "A" is a point which represents the density at a temperature $T_4$ at which a completely decolored state is achieved (hereinafter, referred to as "complete decoloration temperature"); "B" is a point which represents the density at a temperature $T_3$ at which a completely colored state can be maintained (hereinafter, referred to as "decoloration on-set temperature"); "C" is a point which represents the density at a temperature $T_2$ at which a completely decolored state can be maintained (hereinafter, referred to as "coloration on-set temperature"); and "D" is a point which represents the density at a temperature $T_1$ at which a completely colored state is achieved (hereinafter, referred to as "complete coloration temperature").

The discoloration temperature region is a temperature region between $T_1$ and $T_4$, and the temperature region between $T_2$ and $T_3$ is a substantial discoloration temperature region, that is, a temperature region where either a colored state or a decolored state can be maintained.

Specifically, a change of the thermochromic color-memory composition from a decolored state to a colored state can be initiated by cooling the composition to the coloration on-set temperature or lower. A completely colored state can be brought about by cooling the composition to the complete coloration temperature or lower, and this state can be maintained unless the temperature of the thermochromic color-memory composition is increased to the decoloration on-set temperature.

Further, a change of the thermochromic color-memory composition from a colored state to a decolored state can be initiated by heating the composition to the decoloration on-set temperature or higher with application of heat generated by friction or the like. A completely decolored state can be brought about by heating the composition to the complete decoloration temperature or higher, and this state can be maintained unless the temperature of the thermochromic color-memory composition is decreased to the coloration on-set temperature.

The length of a line segment EF is a scale representing the contrast of discoloration, and the length of a line segment HG is a temperature width representing the degree of hysteresis (hysteresis width). The greater the ΔH value, the more easily the respective states before and after discoloration can be maintained. The ΔH value in which the respective states before and after discoloration can be maintained is 8° C. or greater, specifically in a range of 8° C. to 80° C. Here, Δt, which is a difference between $T_4$ and $T_3$ or between $T_2$ and $T_1$, is a scale representing the sensitivity of the discoloration, and a practical range thereof is 1° C. to 15° C., preferably 1° C. to 10° C.

In order to allow only one specific state of those states before and after discoloration to exist in a normal temperature range, the complete decoloration temperature ($T_4$) is preferably 40° C. or higher, more preferably 50° C. or higher, still more preferably 60° C. or higher, and the coloration on-set temperature ($T_2$) is preferably 0° C. or lower, more preferably −5° C. or lower, still more preferably −10° C. or lower.

As an example, the conditions of the component (a) composed of an electron-donating color-developing organic compound comprising a lactone ring, the component (b) composed of an electron-accepting compound and the component (c) comprising an ester compound, all of which are contained in the thermochromic color-memory composition, in a colored state and a decolored state, will now be described.

First, in a colored state, the components (a) and (b) contained in the thermochromic color-memory composition of the present invention interact with each other and the lactone ring of the electron-donating color-developing organic compound constituting the component (a) is thereby opened. In this condition, the ester compound contained in the component (c) is in a crystallized state.

The ester compound contained in the component (c) is melted by increasing the temperature of this thermochromic color-memory composition to the melting point of the ester compound or higher. As a result, the reaction phase shifts from a solid phase to a liquid phase and the compound constituting the component (a) and the compound constituting the component (b) are both in a state of being dissolved in the component (c); therefore, the interaction between the compound constituting the component (a) and the compound constituting the component (b) is blocked and the lactone ring of the compound constituting the component (a) is thus closed, bringing the thermochromic color-memory composition into a decolored state.

Meanwhile, by decreasing the temperature of the thermochromic color-memory composition in a decolored state to the freezing point of the ester compound contained in the component (c) or lower, solidification of the ester compound is initiated and the reaction phase shifts from a liquid phase to a solid phase. As a result, the compounds constituting the components (a) and (b) are precipitated and these compounds again interact with each other; therefore, the lactone ring of the compound constituting the component (a) is opened, bringing the thermochromic color-memory composition into a colored state.

These components may be a mixture of two or more compounds, respectively. In addition, the microcapsule pigment of the present invention may further contain, for example, an antioxidant, an ultraviolet absorber, an infrared absorber and/or a solubilizing aid within a range where its functions are not impaired.

The functions of the components (a), (b) and (c) as well as specific compounds of the respective components will be exemplified below.

The component (a) of the present invention is a color-determining component and composed of an electron-donating color-developing organic compound which develops a color and donates an electron(s) to the component (b), which is a color developer.

Examples of the component (a) of the present invention, namely electron-donating color-developing organic compound, include phthalide compounds, fluoran compounds, styrylquinoline compounds, diazarhodamine lactone compounds, pyridine compounds, quinazoline compounds and bisquinazoline compounds, among which phthalide compounds and fluoran compounds are preferred. Examples of the phthalide compounds include diphenylmethane phthalide compounds, phenylindolyl phthalide compounds, indolyl phthalide compounds, diphenylmethane azaphthalide compounds, phenylindolyl azaphthalide compounds and derivatives of these compounds, among which phenylindolyl azaphthalide compounds and their derivatives are preferred. Examples of the fluoran compounds include aminofluoran compounds, alkoxyfluoran compounds, and derivatives of these compounds.

Examples of the electron-donating color-developing organic compound include the followings:
3,3-bis(p-dimethylaminophenyl)-6-dimethylaminophthalide,
3-(4-diethylaminophenyl)-3-(1-ethyl-2-methylindol-3-yl)phthalide,
3,3-bis(1-n-butyl-2-methylindol-3-yl)phthalide,
3,3-bis(2-ethoxy-4-diethylaminophenyl)-4-azaphthalide,
3-[2-ethoxy-4-(N-ethylanilino)phenyl]-3-(1-ethyl-2-methylindol-3-yl)-4-azaphthalide,
3,6-diphenylaminofluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methyl-6-di-n-butylaminofluoran,
2-xylidino-3-methyl-6-diethylaminofluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H)isobenzofuran]-3'-one,
2-(diethylamino)-8-(diethylamino)-4-methyl-spiro[5H-(1)benzopyrano(2,3-g)pyrimidine-5,1'(3'H)isobenzofuran]-3-one,
2-(di-n-butylamino)-8-(di-n-butylamino)-4-methyl-spiro[5H-(1)benzopyrano(2,3-g)pyrimidine-5,1'(3'H)isobenzofuran]-3-one,
2-(di-n-butylamino)-8-(diethylamino)-4-methyl-spiro[5H-(1)benzopyrano(2,3-g)pyrimidine-5,1'(3'H)isobenzofuran]-3-one,
2-(di-n-butylamino)-8-(N-ethyl-N-i-amylamino)-4-methyl-spiro[5H-(1)benzopyrano(2,3-g)pyrimidine-5,1'(3'H)isobenzofuran]-3-one,
2-(dibutylamino)-8-(dipentylamino)-4-methyl-spiro[5H-(1)benzopyrano(2,3-g)pyrimidine-5,1'(3'H)-isobenzofuran]-3-one,
3-(2-methoxy-4-dimethylaminophenyl)-3-(1-butyl-2-methylindol-3-yl)-4,5,6,7-tetrachlorophthalide,
3-(2-ethoxy-4-diethylaminophenyl)-3-(1-ethyl-2-methylindol-3-yl)-4,5,6,7-tetrachlorophthalide,
3-(2-ethoxy-4-diethylaminophenyl)-3-(1-pentyl-2-methylindol-3-yl)-4,5,6,7-tetrachlorophthalide,
4,5,6,7-tetrachloro-3-[4-(dimethylamino)-2-methylphenyl]-3-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthen]-3-one,
3',6'-bis[phenyl(3-ethylphenyl)amino]-spiro[isobenzofuran-1(3H),9'-[9H]xanthen]-3-one,
4-[2,6-bis(2-ethoxyphenyl)-4-pyridinyl]-N,N-dimethylbenzenamine,
2-(4'-dimethylaminophenyl)-4-methoxy-quinazoline, and
4,4'-(ethylenedioxy)-bis[2-(4-diethylaminophenyl) quinazoline].

In addition to the above-mentioned compounds containing a substituent(s) in a xanthene ring-forming phenyl group, the fluorans may also be compounds showing a blue or black color which contain a substituent in a xanthene ring-forming phenyl group as well as a substituent in a lactone ring-forming phenyl group (these substituents may be, for example, an alkyl group such as a methyl group or a halogen atom such as a chloro group).

The component (b) of the present invention is composed of an electron-accepting compound which receives an electron(s) from the component (a) and functions as a color developer for the component (a).

Examples of the electron-accepting compound of the component (b) include active proton-containing compounds and derivatives thereof; pseudo-acidic compounds (compounds which are not acids but each act as an acid in a composition to cause the component (a) to develop a color); and electron hole-containing compounds. Thereamong, the component (b) is preferably a compound selected from active proton-containing compounds.

Examples of the active proton-containing compounds and derivatives thereof include phenolic hydroxyl group-containing compounds and metal salts thereof; carboxylic acids and metal salts thereof, preferably aromatic carboxylic acids, aliphatic carboxylic acids having 2 to 5 carbon atoms, and metal salts thereof; acidic phosphoric acid esters and metal salts thereof; and azole-based compounds and derivatives thereof, preferably 1,2,3-triazole and derivatives thereof. Thereamong, phenolic hydroxyl group-containing compounds are preferred since they can allow effective thermal discoloration characteristics to be expressed. The phenolic hydroxyl group-containing compounds widely include monophenol compounds and polyphenol compounds, and bis-type and tris-type phenols, phenol-aldehyde condensation resins and the like are also included therein. Among the phenolic hydroxyl group-containing compounds, those which contain at least two benzene rings or have a bis-hydroxyphenyl sulfide structure are preferred. Further, these compounds may also have a substituent, examples of which include an alkyl group, an aryl group, an acyl group, an alkoxycarbonyl group, a carboxy group and an ester thereof, as well as an amide group and a halogen group. Examples of the metal contained in the metal salts of the active proton-containing compounds include sodium, potassium, calcium, zinc, zirconium, aluminum, magnesium, nickel, cobalt, tin, copper, iron, vanadium, titanium, lead and molybdenum.

Specific examples of the phenolic hydroxyl group-containing compounds include the followings:

phenol, o-cresol, tert-butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 1,1-bis(4-hydroxyphenyl)-2-ethylhexane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

The component (c) comprises an ester compound and functions as a reaction medium which reversibly induces an electron transfer reaction between the components (a) and (b) in a specific temperature range. By applying an ester compound as the component (c), thermochromic color-memory compositions having various discoloration temperatures can be obtained.

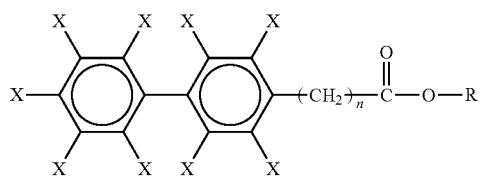

(1)

The ester compound contained in the component (c) used in the present invention is a compound represented by the above Formula (1). In the Formula (1), R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms, preferably an alkyl group having 7 to 18 carbon atoms, a cycloalkylalkyl group having 5 to 11 carbon atoms, a cycloalkyl group having 5 to 8 carbon atoms or an alkenyl group having 7 to 18 carbon atoms, more preferably an alkyl group having 9 to 15 carbon atoms, a cycloalkylalkyl group having 6 to 11 carbon atoms, a cycloalkyl group having 5 to 7 carbon atoms or an alkenyl group having 9 to 15 carbon atoms.

In the Formula (1), n represents 0 or 1, preferably 1.

In the Formula (1), X represents a hydrogen atom, an alkyl group having 1 to 4 carbon atoms, an alkoxy group having 1 to 4 carbon atoms or a halogen atom, and X is preferably a hydrogen atom or an alkyl group having 1 to 4 carbon atoms, more preferably a hydrogen atom or an alkyl group having 1 or 2 carbon atoms.

More preferably, the Formula (1) is a structure which satisfies the following Formula (2) or (3).

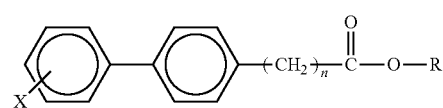

(2)

(wherein, R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms, preferably an alkyl group having 7 to 18 carbon atoms, a cycloalkylalkyl group having 5 to 11 carbon atoms, a cycloalkyl group having 5 to 8 carbon atoms or an alkenyl group having 7 to 18 carbon atoms, more preferably an alkyl group having 9 to 15 carbon atoms, a cycloalkylalkyl group having 6 to 11 carbon atoms, a cycloalkyl group having 5 to 7 carbon atoms or an alkenyl group having 9 to 15 carbon atoms; X represents a hydrogen atom, an alkyl group having 1 to 4 carbon atoms, an alkoxy group having 1 to 4 carbon atoms or a halogen atom, preferably a hydrogen atom or an alkyl group having 1 to 4 carbon atoms, more preferably a hydrogen atom or an alkyl group having 1 or 2 carbon atoms; and n represents 0 or 1, preferably 1)

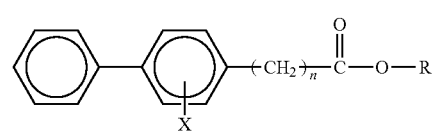

(3)

(wherein, R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms, preferably an alkyl group having 7 to 18 carbon atoms, a cycloalkylalkyl group having 5 to 11 carbon atoms, a cycloalkyl group having 5 to 8 carbon atoms or an alkenyl group having 7 to 18 carbon atoms, more preferably an alkyl group having 9 to 15 carbon atoms, a cycloalkylalkyl group having 6 to 11 carbon atoms, a cycloalkyl group having 5 to 7 carbon atoms or an alkenyl group having 9 to 15 carbon atoms; X represents a hydrogen atom, an alkyl group having 1 to 4 carbon atoms, an alkoxy group having 1 to 4 carbon atoms or a halogen atom, preferably a hydrogen atom or an alkyl group having 1 to 4 carbon atoms, more preferably a hydrogen atom or an alkyl group having 1 or 2 carbon atoms; and n represents 0 or 1, preferably 1)

Examples of the cycloalkylalkyl groups include a cyclobutylethyl group, a cyclobutylpropyl group, a cyclopentylmethyl group, a cyclopentylethyl group, a cyclopentylpropyl group, a cyclohexylmethyl group, a cyclohexylethyl group, a cyclohexylpropyl group, a cycloheptylmethyl group and a cycloheptylethyl group.

Specific examples of the ester compound represented by the Formula (1) are shown below.

Compound 1

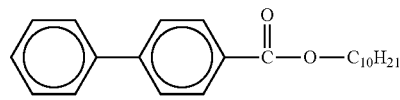

Compound 2
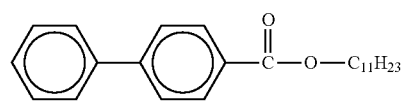
Compound 3
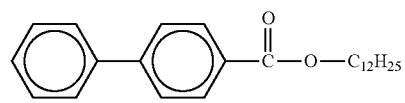
Compound 4
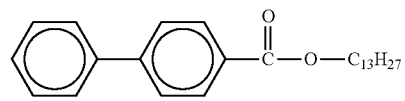
Compound 5
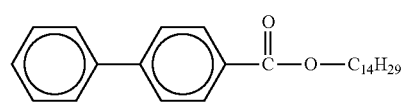
Compound 6
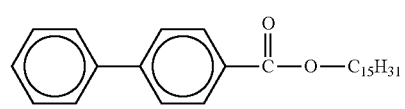
Compound 7
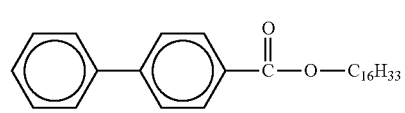
Compound 8
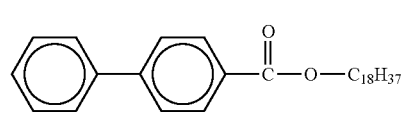
Compound 9
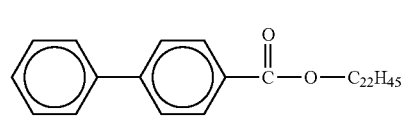
Compound 10
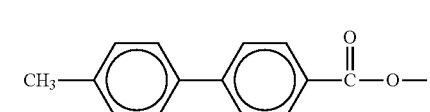
Compound 11
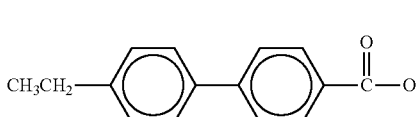
Compound 12
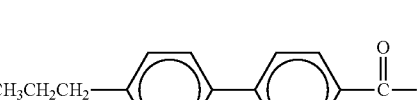
Compound 13
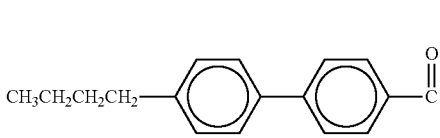
Compound 14
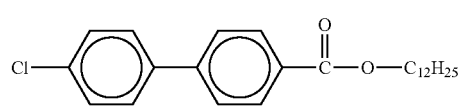
Compound 15
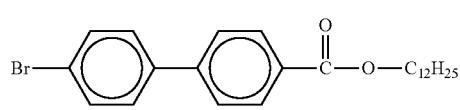
Compound 16
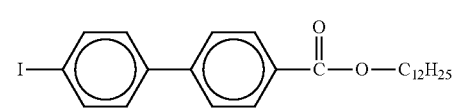
Compound 17
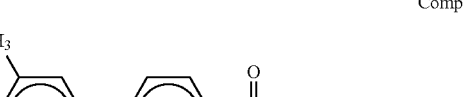
Compound 18
Compound 19
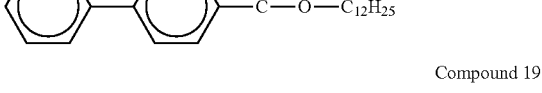
Compound 20
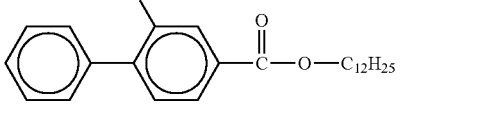
Compound 21
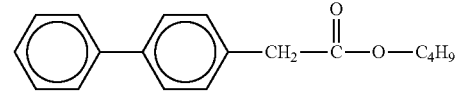
Compound 22
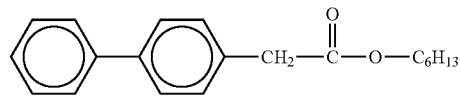
Compound 23
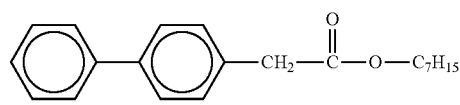
Compound 24
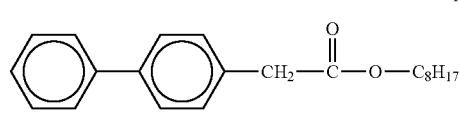
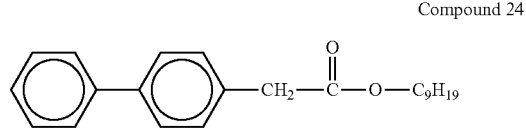

-continued
Compound 25
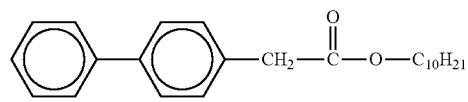
Compound 26
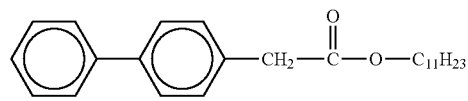
Compound 27
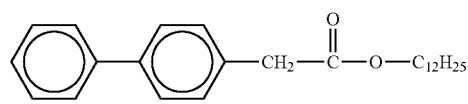
Compound 28
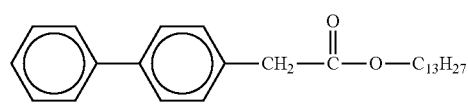
Compound 29
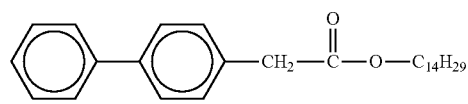
Compound 30
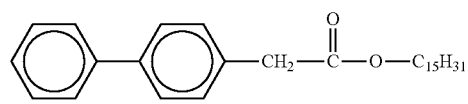
Compound 31
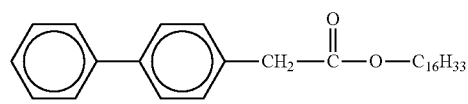
Compound 32
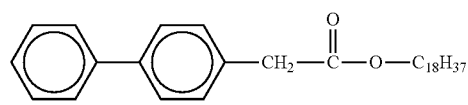
Compound 33
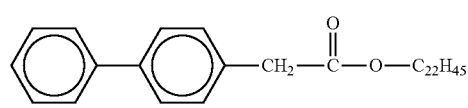
Compound 34
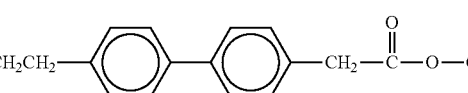
Compound 35
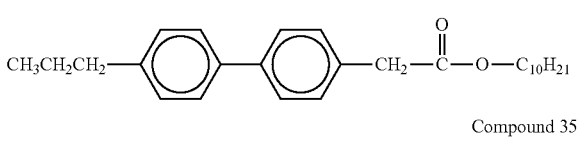
Compound 36
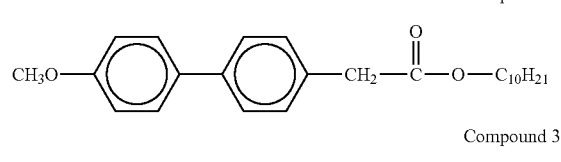
Compound 37
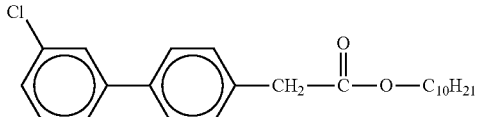
Compound 38
Compound 39
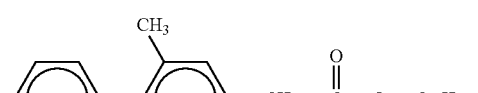
Compound 40
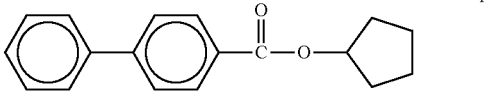
Compound 41
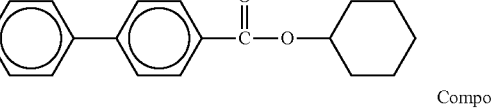
Compound 42
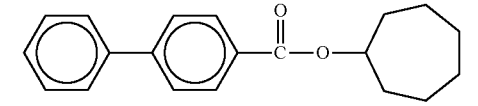
Compound 43
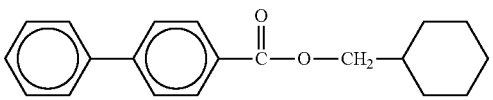
Compound 44
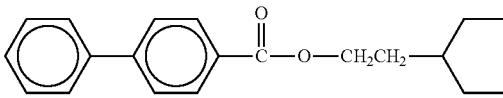
Compound 45
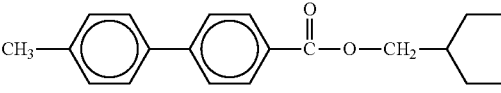
Compound 46
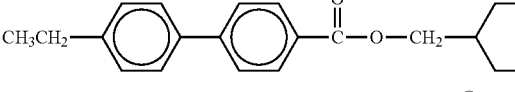
Compound 47
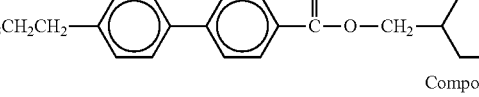
Compound 48
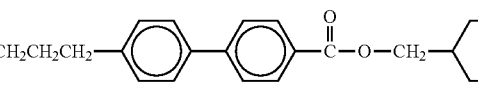

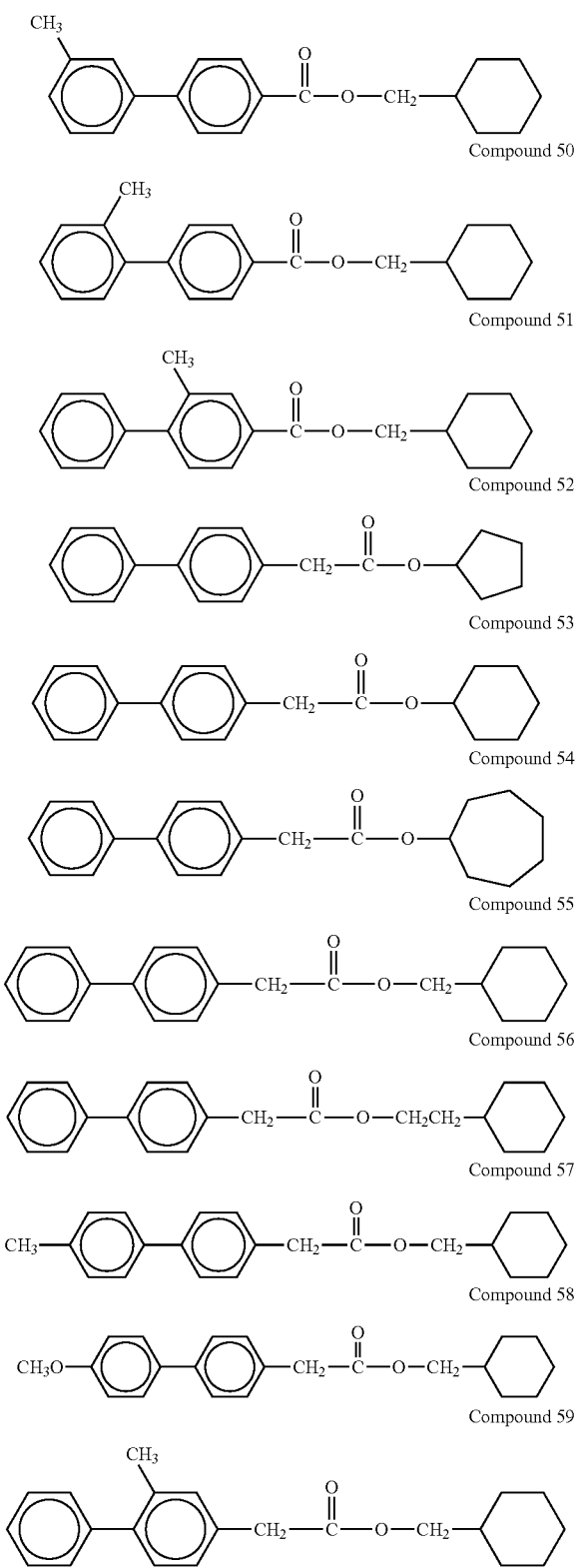

By incorporating any of the above-described ester compounds into thermochromic color-memory composition of the present invention, the thermochromic color-memory composition is enabled to achieve a broad hysteresis width at a level which is the same or higher than that of a conventional ester compound-containing composition and to have an excellent function of selectively maintaining either a color at the lower temperature side than the discoloration temperature or a color at the higher temperature side than the discoloration temperature; therefore, the thermochromic color-memory composition has excellent applicability to various applications.

The component (c) may contain two or more compounds satisfying the Formula (1). In addition, the component (c) may further contain a conventionally known component(s) not satisfying the Formula (1), such other esters, alcohols, carboxylic acids, ketones and amides.

Examples of the above-described other esters, alcohols, carboxylic acids, ketones and amides include: those compounds used in reversibly thermochromic compositions having a property of showing a small hysteresis width, which compounds change colors across a prescribed temperature (discoloration point) to display a decolored state in a temperature range of not lower than the discoloration point of the higher temperature side and a colored state in a temperature range of not higher than the discoloration point of the lower temperature side and in which only one specific state of the above-described states exits in a normal temperature range and the other state is maintained while heat or cold required for the expression of the specific state is being applied but the state in the normal temperature range is restored once the application of heat or cold is terminated; and those compounds used in reversibly thermochromic compositions exhibiting a color-memory property, which compounds change colors showing prominent hysteresis characteristics in terms of color density-temperature curve (the curves plotting the color density change occurring due to temperature change are different between the temperature change from the lower side to the higher side and the temperature change from the higher side to the lower side).

Examples of the above-described other esters include carboxylic acid ester compounds such as esters of a fatty acid and an aliphatic alcohol, esters of a fatty acid and an aromatic ring-containing alcohol or phenol, esters of an aromatic ring-containing carboxylic acid and an aromatic ring-containing alcohol or phenol, and esters of an aromatic ring-containing carboxylic acid and an aliphatic alcohol. It is noted here that the aromatic ring may contain a substituent. In addition, the aliphatic alcohol and fatty acid may have a branched chain and form a cyclic structure. Further, the carboxylic acid may contain two or more carboxyl groups therein. Moreover, the alcohol and phenol may contain two or more hydroxyl groups therein.

Specific examples of such esters include esters obtained from a fatty acid having 8 or more carbon atoms and an aliphatic alcohol, preferably esters having a total of 17 to 23 carbon atoms which are obtained from a fatty acid having 10 to 16 even-numbered carbon atoms and n-pentyl alcohol or n-heptyl alcohol; esters obtained from a fatty acid having 6 or more carbon atoms and an unsubstituted aromatic alcohol or phenol; esters obtained from an aromatic ring-containing carboxylic acid and an aliphatic alcohol having 10 or more carbon atoms; esters obtained from a dicarboxylic acid and an aromatic alcohol, branched aliphatic alcohol or linear aliphatic alcohol having 10 or more carbon atoms; and esters obtained from a fatty acid having an even number of carbon atoms and an aliphatic alcohol having 9 or more odd-numbered carbon atoms.

More specific examples of the esters include benzyl cinnamate, n-methylbenzyl stearate, n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-heptyl stearate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, n-pentadecyl behenate, didecyl adipate, dilauryl adipate, dimyristyl adipate, dicetyl adipate, distearyl adipate, dimyristin, distearin, trilaurin, trimyristin and tristearin.

The component (c) may also contain an ester compound represented by the following Formula (10):

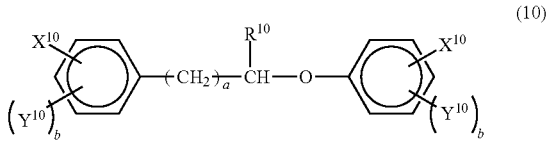

(wherein, $R^{10}$ represents a hydrogen atom or a methyl group; a represents an integer of 0 to 2; one of $X^{10}$s represents —$(CH_2)_n$OCOR' or —$(CH_2)_n$COOR' and the other represents a hydrogen atom; n represents an integer of 0 to 2; R' represents an alkyl or alkenyl group having 4 or more carbon atoms; each $Y^{10}$ independently represents a hydrogen atom, an alkyl group having 1 to 4 carbon atoms, a methoxy group or a halogen; and each b independently represents an integer of 1 to 3).

Among those compounds which are represented by the Formula (10), ones in which $R^{10}$ is a hydrogen atom are preferred since a reversibly thermochromic composition having a broader hysteresis width can be obtained, and ones in which $R^{10}$ is a hydrogen atom and a is 0 are more preferred.

Among those compounds which are represented by the Formula (10), a compound represented by the following Formula (11) is more preferably used:

(wherein $R^{11}$ represents an alkyl or alkenyl group having 8 or more carbon atoms, preferably an alkyl group having 10 to 24 carbon atoms, more preferably an alkyl group having 12 to 22 carbon atoms).

Specific examples of an ester compound satisfying the Formulae (10) and (11) include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate and 4-benzyloxyphenylethyl octadecanoate.

The component (c) may also contain an ester compound represented by the following Formula (12):

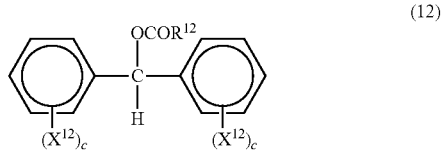

(wherein, $R^{12}$ represents an alkyl or alkenyl group having 8 or more carbon atoms; each c independently represents an integer of 1 to 3; and each $X^{12}$ independently represents a hydrogen atom, an alkyl group having 1 to 4 carbon atoms, an alkoxy group having 1 to 4 carbon atoms or a halogen).

Specific examples of an ester compound satisfying the Formula (12) include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate and 1,1-diphenylmethyl octadecanoate.

The component (c) may also contain an ester compound represented by the following Formula (13):

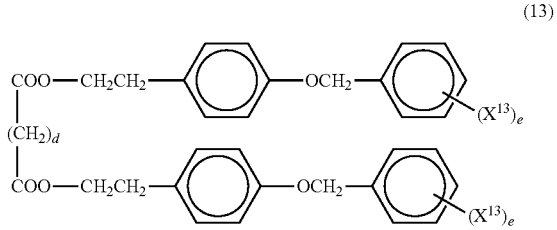

(wherein, each $X^{13}$ independently represents a hydrogen atom, an alkyl group having 1 to 4 carbon atoms, a methoxy group or a halogen atom; each e independently represents an integer of 1 to 3; and d represents an integer of 1 to 20).

Examples of an ester compound satisfying the Formula (13) include diester of malonic acid and 2-[4-(4-chlorobenzyloxy)phenyl]ethanol; diester of succinic acid and 2-(benzyloxyphenyl)ethanol; diester of succinic acid and 2-[4-(3-methylbenzyloxy)phenyl]ethanol; diester of glutaric acid and 2-(4-benzyloxyphenyl)ethanol; diester of glutaric acid and 2-[4-(4-chlorobenzyloxy)phenyl]ethanol; diester of adipic acid and 2-(4-benzyloxyphenyl)ethanol; diester of pimelic acid and 2-(4-benzyloxyphenyl)ethanol; diester of suberic acid and 2-(4-benzyloxyphenyl)ethanol; diester of suberic acid and 2-[4-(3-methylbenzyloxy)phenyl]ethanol; diester of suberic acid and 2-[4-(4-chlorobenzyloxy)phenyl]ethanol; diester of suberic acid and 2-[4-(2,4-dichlorobenzyloxy)phenyl]ethanol; diester of azelaic acid and 2-(4-benzyloxyphenyl)ethanol; diester of sebacic acid and 2-(4-benzyloxyphenyl)ethanol; diester of 1,10-decanedicarboxylic acid and 2-(4-benzyloxyphenyl)ethanol; diester of 1,18-octadecanedicarboxylic acid and 2-(4-benzyloxyphenyl)ethanol; and diester of 1,18-octadecanedicarboxylic acid and 2-[4-(2-methylbenzyloxy)phenyl]ethanol.

The component (c) may also contain an ester compound represented by the following Formula (14):

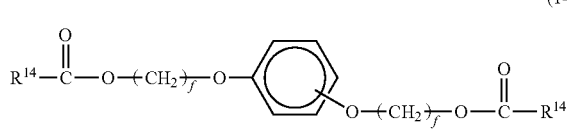

(wherein, $R^{14}$ represents an alkyl or alkenyl group having 1 to 21 carbon atoms; and each f independently represents an integer of 1 to 3).

Examples of an ester compound satisfying the Formula (14) include diester of 1,3-bis(2-hydroxyethoxy)benzene and capric acid; diester of 1,3-bis(2-hydroxyethoxy)benzene and undecanoic acid; diester of 1,3-bis(2-hydroxyethoxy)benzene and lauric acid; diester of 1,3-bis(2-hydroxyethoxy)benzene and myristic acid; diester of 1,4-bis(hydroxymethoxy)benzene and butyric acid; diester of 1,4-bis(hydroxymethoxy)benzene and isovaleric acid; diester of 1,4-bis(2-hydroxyethoxy)benzene and acetic acid; diester of 1,4-bis(2-hydroxyethoxy)benzene and propionic acid; diester of 1,4-bis(2-hydroxyethoxy)benzene and valeric acid; diester of 1,4-bis(2-hydroxyethoxy)benzene and caproic acid; diester of 1,4-bis(2-hydroxyethoxy)benzene and caprylic acid; diester of 1,4-bis(2-hydroxyethoxy)benzene and capric acid; diester of 1,4-bis(2-hydroxyethoxy)benzene and lauric acid; and diester of 1,4-bis(2-hydroxyethoxy)benzene and myristic acid.

The component (c) may also contain an ester compound represented by the following Formula (15):

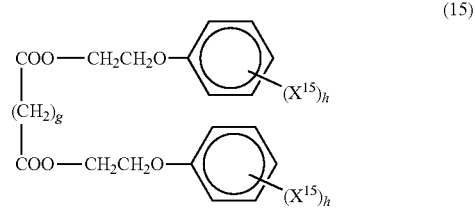

(wherein, each $X^{15}$ independently represents a hydrogen atom, an alkyl group having 1 to 4 carbon atoms, an alkoxy group having 1 to 4 carbon atoms or a halogen atom; h represents an integer of 1 to 3; and g represents an integer of 1 to 20).

Examples of an ester compound satisfying the Formula (15) include diester of succinic acid and 2-phenoxyethanol; diester of suberic acid and 2-phenoxyethanol; diester of sebacic acid and 2-phenoxyethanol; diester of 1,10-decanedicarboxylic acid and 2-phenoxyethanol; and diester of 1,18-octadecanedicarboxylic acid and 2-phenoxyethanol.

When the component (c) contains other ester(s) and the like that do not satisfy the Formula (1), the content thereof is preferably 1 to 30 parts by mass, more preferably 5 to 30 parts by mass, still more preferably 5 to 25 parts by mass, with respect to the total mass of the component (c).

In the present invention, the ratio of the components (a), (b) and (c) varies depending on the concentration, discoloration temperature, mode of discoloration and the type of each component; however, generally, as a component ratio at which desired properties are obtained, the ratio of the component (b) is in a range of preferably 0.1 to 50, more preferably 0.5 to 20, still more preferably 2 to 20 and that of the component (c) is in a range of preferably 1 to 800, more preferably 5 to 200, still more preferably 10 to 200, taking the amount of the component (a) as 1 (these ratios are all based on parts by mass).

The above-described three components can be encapsulated in a microcapsule to form thermochromic color-memory microcapsule pigment. By protecting the components with a capsule membrane wall, it is needless to say that their functions are not deteriorated even if the components are brought into contact with a chemically active substance such as an acidic substance, a basic substance or a peroxide or with other solvent component, and the heat stability can also be improved.

Further, the microcapsule pigment can be put into practical use after forming a secondary resin coating film on the surface thereof in accordance with the intended use so as to impart the microcapsule pigment with durability or to modify the surface properties.

The average particle size of the microcapsule pigment is in a range of preferably 0.1 to 50 µm, more preferably 0.1 to 30 µm, still more preferably 0.5 to 20 µm and, in this case, the microcapsule pigment has an improved practicality.

The particle size and the particle size distribution are measured using a laser diffraction/scattering-type particle size distribution analyzer [manufactured by Horiba, Ltd.; LA-300], and the average particle size (median diameter) is calculated based on volume from the thus measured values.

For blending of the microcapsule pigment into an ink, a paint or a thermoplastic resin, in order to maintain the dispersion stability and processing suitability, the average particle size is preferably not larger than 50 µm.

Meanwhile, in order to realize high-density color development, the average particle size is preferably not smaller than 0.1 µm.

Further, by making the microcapsule pigment into fine particles, the ΔH value thereof can be made larger than the ΔH value of the composition of the three components.

In the microcapsule pigment, the ratio of the content and the membrane wall (content/membrane wall) is preferably in a range of 7/1 to 1/1 (mass ratio). By controlling the ratio of the membrane wall in this range, reduction in the color density and clarity during color development can be inhibited. The ratio of the content and the membrane wall (content/membrane wall) is more preferably 6/1 to 1/1 (mass ratio).

The microencapsulation can be carried out by a conventionally known method such as interfacial polymerization of an isocyanate system, in situ polymerization of a melamine-formalin system or the like, submerged curing and coating, phase separation from an aqueous solution, phase separation from an organic solvent, melt-dispersion and cooling, gaseous suspension and coating, or spray drying. The microencapsulation method is selected as appropriate in accordance with the intended use.

In the microcapsule pigment, a conventional dye or pigment (non-thermochromic one) can also be incorporated so as to allow the microcapsule pigment to exhibit a discoloration behavior from a color (1) to a color (2).

The thermochromic color-memory microcapsule pigment can be dispersed in an additive-containing vehicle as required and utilized as thermochromic color-memory liquid composition for, for example, printing inks used in screen printing, offset printing, process printing, gravure printing, coater printing, pad printing or the like; paints used in brush coating, spray coating, electrostatic coating, electrodeposition coating, flow coating, roller coating, dip coating or the like; inks for writing instruments such as marking pens, ballpoint pens, fountain pens and brush pens; inks for coating tools; painting colors; cosmetics; and coloring liquids for fibers.

Examples of the additive include resins, cross-linking agents, curing agents, desiccants, plasticizers, viscosity-adjusting agents, dispersants, ultraviolet absorbers, antioxidants, light stabilizers, anti-settling agents, lubricants, gelling agents, antifoaming agents, delustering agents, penetrating agents, pH regulators, foaming agents, coupling agents, humectants, antifungal agents, preservatives and anticorrosives.

In the present invention, the ink composition can contain the thermochromic color-memory microcapsule pigment in an amount of preferably 5 to 40% by mass, more preferably 10 to 40% by mass, still more preferably 10 to 30% by mass, with respect to the total mass of the ink composition. By controlling the content of the microcapsule pigment in this range, a desirable color development density can be achieved and deterioration of the ink outflow properties can be further inhibited.

Among such ink compositions, in ink compositions for writing instruments, example of a vehicle for writing instrument which can be used therein include oil-based vehicles containing an organic solvent; and aqueous vehicles containing water and, as required, an organic solvent.

Examples of the organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone and N-methyl-2-pyrrolidone.

Examples of the ink compositions for writing instruments include shear-thinning ink compositions containing a shear-thinning agent in a vehicle; and cohesive ink compositions containing an aqueous polymeric coagulant in a vehicle, in which a pigment is suspended in a loosely aggregated state.

By adding the shear-thinning agent, not only aggregation and sedimentation of the pigment but also bleeding of handwriting can be inhibited, so that good handwriting can be made.

Further, in cases where the writing instrument to be filled with the ink composition is in the form of a ballpoint pen, leakage of the ink from a gap between a ball and a tip can be inhibited when the pen is not in use, and backflow of the ink composition can be inhibited when the pen is left with the writing end facing upward (in an upright state).

Examples of the shear-thinning agent include xanthan gum; welan gum; succinoglycans (average molecular weight: about 1,000,000 to 8,000,000), which are organic acid-modified hetero-polysaccharides comprising glucose and galactose as constituting monosaccharides; guar gum; locust bean gum and derivatives thereof; hydroxyethyl cellulose; alkyl alginate esters; polymers containing an alkyl ester of methacrylic acid as a main component and having a molecular weight of 100,000 to 150,000; glucomannan; thickening polysaccharides which have a gelation ability and are extracted from seaweeds, such as agar or carrageenin; benzylidene sorbitol, benzylidene xylitol, and derivatives thereof; cross-linkable acrylic acid polymers; inorganic fine particles; nonionic surfactants having an HLB value of 8 to 12, such as polyglycerin fatty acid esters, polyoxyethylene sorbitan fatty acid esters, polyethylene glycol fatty acid esters, polyoxyethylene alkyl ethers, polyoxypropylene alkyl ethers, polyoxyethylene alkylphenyl ethers and fatty acid amides; salts of dialkyl or dialkenyl sulfosuccinic acids; mixtures of N-alkyl-2-pyrrolidone and an anionic surfactant; and mixtures of a polyvinyl alcohol and an acrylic resin.

Examples of the aqueous polymeric coagulant include polyvinylpyrrolidones, polyethylene oxides and aqueous polysaccharides.

Examples of the aqueous polysaccharides include tragacanth gum, guar gum, pullulan, cyclodextrin and aqueous cellulose derivatives, and specific examples of the aqueous cellulose derivatives include methyl cellulose, hydroxyethyl cellulose, hydroxypropyl cellulose, hydroxyethylmethyl cellulose and hydroxypropylmethyl cellulose.

By using a comb-type polymeric dispersant containing carboxyl groups in side chains and an organic nitrogen sulfur compound in combination with the polymeric coagulant, the dispersibility of loose aggregates of the microcapsule pigment formed by the action of the polymeric coagulant can be improved.

The comb-type polymeric dispersant containing carboxyl groups in side chains is not particularly restricted as long as it is a comb-type polymeric compound having a plurality of carboxyl groups in side chains, and it is preferably an acrylic polymer compound having a plurality of carboxyl groups in side chains, examples of which include SOLSPERSE 43000 (trade name) manufactured by Lubrizol Japan Ltd.

The organic nitrogen sulfur compound further inhibits the sedimentation of the microcapsule pigment caused by vibration when the ink composition is filled in a writing instrument for practical use.

This allows the loose aggregates of the microcapsule pigment to be dispersed by the action of the comb-type polymeric dispersant containing carboxyl groups in side chains, and the dispersibility is thereby further improved.

As the organic nitrogen sulfur compound, a compound selected from thiazole-based compounds, isothiazole-based compounds, benzothiazole-based compounds and benzisothiazole-based compounds is used.

As the organic nitrogen sulfur compound, specifically, one or more compounds selected from 2-(4-thiazoyl)-benzimidazole (TBZ), 2-(thiocyanatemethylthio)-1,3-benzothiazol (TCMTB), 2-methyl-4-isothiazolin-3-one and 5-chloro-2-methyl-4-isothiazolin-3-one are used and, preferably, one or more compounds selected from 2-(4-thiazoyl)-benzimidazole (TBZ), 2-methyl-4-isothiazolin-3-one and 5-chloro-2-methyl-4-isothiazolin-3-one are used.

Examples of the organic nitrogen sulfur compound include TOPSIDE 88, TOPSIDE 133, TOPSIDE 170, TOPSIDE 220, TOPSIDE 288, TOPSIDE 300, TOPSIDE 400, TOPSIDE 500, TOPSIDE 600, TOPSIDE 700Z, TOPSIDE 800 and TOPSIDE 950 (trade names), which are manufactured by Permachem Asia Ltd.; and HOKUSTAR HP, HOKUSTAR E50A, HOKUSIDE P200, HOKUSIDE 6500, HOKUSIDE 7400, HOKUSIDE MC, HOKUSIDE 369 and HOKUSIDE R-150 (trade names), which are manufactured by Hokko Sangyo, Co., Ltd.

The mass ratio of the comb-type polymeric dispersant containing carboxyl groups in side chains and the organic nitrogen sulfur compound is preferably 1:1 to 1:10, more preferably 1:1 to 1:5. By satisfying this range, the dispersibility of the loose aggregates of the microcapsule pigment and inhibition of the sedimentation of the microcapsule pigment caused by vibration can be sufficiently exhibited.

Further, by adding an aqueous resin which is applied for the purpose of imparting a handwritten material with fixability on paper surface and viscosity, the function of improving the stability of the microcapsule pigment in an ink which comprises the comb-type polymeric dispersant containing carboxyl groups in side chains and the organic nitrogen sulfur compound is further improved.

Examples of the aqueous resin include alkyd resins, acryl resins, styrene-maleic acid copolymers, cellulose derivatives, polyvinylpyrrolidones, polyvinyl alcohols and dextrin, among which a polyvinyl alcohol is preferably used.

Further, as the polyvinyl alcohol, a partially saponified polyvinyl alcohol having a saponification degree of 70 to 89% by mol is more preferably used since it allows the ink composition to have excellent solubility even in an acidic range.

As for the amount of the aqueous resin to be added, it is added to the ink composition in a range of preferably 0.3 to 3.0% by mass, more preferably 0.5 to 1.5% by mass.

In cases where the ink composition is filled into a ballpoint pen, it is preferred to prevent abrasion of the ball-receiving base by adding a lubricant, examples of which include higher fatty acids such as oleic acid; nonionic surfactants having a long-chain alkyl group; polyether-modified silicone oils; thiophosphorous acid triesters such as tri(alkoxycarbonylmethylester) thiophosphite and tri(alkoxycarbonylethylester) thiophosphite; phosphomonoesters of polyoxyethylene alkyl ether or polyoxyethylene alkylaryl ether; phosphodiesters of polyoxyethylene alkyl ether or polyoxyethylene alkylaryl ether; and metal salts, ammonium salts, amine salts and alkanolamine salts thereof.

Further, by incorporating 2,5-dimercapto-1,3,4-thiadiazole and/or a salt thereof, even when the pH of the ink is in an acidic or alkaline range, not only defective dispersion and aggregation of the microcapsule pigment which occur after the once-frozen ink composition is thawed again can be suppressed and an increase in the viscosity of the ink composition and its accompanying blurring and color-fading of handwriting can be inhibited, but also, when the ink composition is used in a ballpoint pen, corrosion of the ball can be inhibited.

In addition, if necessary, a resin such as an acryl resin, a styrene-maleic acid copolymer, a cellulose derivative, polyvinylpyrrolidone, polyvinyl alcohol or dextrin may be added to impart the ink composition with fixability to paper surface and viscosity. Furthermore, an inorganic salt such as sodium carbonate, sodium phosphate or sodium acetate; a pH regulator, for example, an organic basic compound such as an aqueous amine compound; an anticorrosive such as benzotriazole, tolyltriazole, dicyclohexylammonium nitrite, diisopropylammonium nitrite or saponin; a preservative or an antifungal agent, such as carbolic acid, sodium salt of 1,2-benzthiazolin-3-one, sodium benzoate, sodium dehydroacetate, potassium sorbate, paraoxypropylbenzoate or 2,3,5,6-tetrachloro-4-(methylsulfonyl)pyridine; a wetting agent such as urea, a non-ionic surfactant, a reduced or non-reduced starch hydrolysate, an oligosaccharide (e.g. trehalose), sucrose, cyclodextrin, glucose, dextrin, sorbitol, mannitol or sodium pyrophosphate; an antifoaming agent; a dispersant; and/or a fluorine-based or non-ionic surfactant which improves the permeability of the ink composition may also be added.

A writing instrument in which the above-described ink composition is stored will now be described. The writing instrument of the present invention comprises: an axial barrel which stores the ink composition; and a pen body which delivers the ink composition from the axial barrel. Examples of the pen body include a marking pen body, a ballpoint pen body and a brush pen body. Examples of the marking pen body include marking tips such as fiber tips, felt tips and plastic tips. Examples of the ballpoint pen body include ballpoint pen tips. Examples of the brush pen body include fiber bundles in which fibers are tightly bundled with each other along the longitudinal direction; plastic porous articles having continuous pores; heat-fused or resin-processed articles of synthetic resin fibers; and extrusion-molded articles of a soft resin or an elastomer.

A ballpoint pen and a marking pen in which the above-described ink composition is stored will now be described in more detail. In cases where the ink composition is filled into a ballpoint pen, the structure and shape of the ballpoint pen itself are not particularly restricted. Examples thereof include a ballpoint pen having a mechanism in which the ink composition is impregnated into an ink absorbent composed of a fiber bundle which is installed inside the axial barrel and the ink composition is supplied therefrom to the writing end; a ballpoint pen having a structure in which the ink composition is directly stored in the axial barrel and an ink flow-controlling member having comb-form grooves or an ink flow-controlling member composed of a fiber bundle is installed; and a ballpoint pen comprising an ink composition-storing tube in the axial barrel, which ink composition-storing tube is filled with a shear-thinning ink composition, connected to a ballpoint pen tip fitted with a ball on one end, and has a liquid plug for prevention of backflow which is provided in close contact with the surface of the other end. Explaining the ballpoint pen tip in more detail, for example, a tip holding a ball in a ball-holding section formed by press-deforming the vicinity of an end of a metal pipe inwardly from outside; a tip holing a ball in a ball-holding section formed by cutting a metal material using a drill or the like; a tip made of a metal or plastic, in which a ball-receiving base made of a resin is arranged; or a tip in which a ball held therein is pressed forward by a spring can be suitably used.

As the ball, one which is made of cemented carbide, stainless steel, ruby, ceramic, resin, rubber or the like and has a diameter of preferably 0.3 to 2.0 mm, more preferably 0.3 to 1.5 mm, still more preferably 0.3 to 1.0 mm or so can be suitably used.

As the ink composition-storing tube which stores the ink composition, for example, a molded article made of a composition, such as polyethylene, polypropylene, polyethylene terephthalate or nylon or a metal tube can be used.

The ink composition-storing tube may be directly connected with the tip, or the ink composition-storing tube may be connected with the tip via a connection member.

The ink composition-storing tube may be in the form of a refill arranged in an axial barrel made of a resin or metal, or an axial barrel fitted with a tip on one end may itself be used as an ink composition-storing body and the ink composition may be directly filled into this axial barrel.

In cases where the ink composition is stored in a retractable ballpoint pen, the structure and shape of the retractable ballpoint pen are not particularly restricted, and any retractable ballpoint pen can be used as long as it has a structure in which the ballpoint pen refill is housed inside an axial barrel with the writing end provided thereon being exposed to the outside air and the writing end is projected from the opening of the axial barrel by the action of a projection-retraction mechanism. Examples of a method of operating the projection-retraction mechanism include a knock-type method, a rotation-type method and a slide-type method.

Examples of the knock-type mechanism include a configuration in which a knocking part is arranged on the rear end or side of the axial barrel and the ballpoint pen tip is projected from the front-end opening of the axial barrel by pushing the knocking part; and a configuration in which the ballpoint pen tip is projected from the front-end opening of the axial barrel by pushing a clip arranged on the axial barrel.

Examples of the rotation-type mechanism include a configuration in which a rotary part is arranged on a rear part of the axial barrel and the ballpoint pen tip is projected or retracted through the front-end opening of the axial barrel by rotating the rotary part.

Examples of the slide-type mechanism include a configuration in which a slide is arranged on the side of the axial barrel and the ballpoint pen tip is projected or retracted through the front-end opening of the axial barrel by operating the slide; and a configuration in which the ballpoint pen tip is projected or retracted through the front-end opening of the axial barrel by sliding a clip arranged on the axial barrel.

The retractable ballpoint pen may be of a complex type in which a plurality of ballpoint pen refills are stored in the axial barrel and the writing end of any one of the ballpoint pen refills is projected or retracted through the front-end opening of the axial barrel by the action of a projection-retraction mechanism.

To the rear end of the ink composition stored in the ink composition-storing tube, an ink follower is added.

The composition of the ink follower comprises a non-volatile liquid or a hardly volatile liquid.

Specific examples thereof include vaseline, spindle oil, castor oil, olive oil, refined mineral oil, liquid paraffin, polybutene, α-olefins, oligomers and co-oligomers of α-olefins, dimethyl silicone oil, methylphenyl silicone oil, amino-modified silicone oil, polyether-modified silicone oil, and fatty acid-modified silicone oil. These may be used individually, or two or more thereof may be used in combination.

It is preferable that the viscosity of the non-volatile liquid and/or hardly volatile liquid be increased to an appropriate level by adding thereto a thickening agent. Examples of the thickening agent include silica having a hydrophobized surface; particulate silica having a methylated surface; aluminum silicate; swellable mica; clay-based thickening agents such as hydrophobized bentonite and montmorillonite; fatty acid metal soaps such as magnesium stearate, calcium stearate, aluminum stearate and zinc stearate; tribenzylidene sorbitol; fatty acid amides; amide-modified polyethylene wax; hydrogenated castor oil; dextrin-based compounds such as fatty acid dextrin; and cellulose-based compounds.

Further, the liquid ink follower may also be used in combination with a solid ink follower.

In cases where the ink composition is filled into a marking pen, the structure and shape of the marking pen itself are not particularly restricted. Examples thereof include a marking pen in which an ink composition absorbent composed of a fiber bundle is installed in the axial barrel, a marking pen tip composed of a fiber processed body having capillary gaps formed therein is fitted on the axial barrel directly or via a connection member, and a cohesive ink composition is impregnated into the ink composition absorbent of the marking pen formed by connecting the ink composition absorbent and the tip; and a marking pent in which a tip and an ink composition-storing tube are arranged via a valve which is opened by pushing the tip and an ink composition is directly stored in the ink composition-storing tube.

The tip is a conventionally and widely used porous member having communicating pores whose porosity is selected to be in a range of about 30 to 70% and which is made of resin-processed fibers, a fused material of heat-melting fibers, a felt or the like, and one end of the tip is processed into a shape conforming to the intended purpose, such as a cannonball shape, a rectangular shape or a chisel shape, before being put into practical use.

The ink composition absorbent is obtained by bundling crimped fibers in the longitudinal direction and configured such that it is provided in a covering material such as a plastic cylinder or a film and the porosity is adjusted to be in a range of about 40% to 90%.

As the valve, a conventionally and widely used pump-type valve can be used; however, a valve whose spring pressure is set such that the valve can be push-opened by writing pressure is preferred.

Further, the form of the ballpoint pen and that of the marking pen are not restricted to the above-described ones, and the writing instrument may be of a double-headed type in which tips of different forms are fitted or pen tips delivering inks of different colors are fitted.

The writing instrument may further comprise a heating tool and/or a cooling tool. The handwriting produced by writing on a writing surface using a writing instrument containing the ink composition is allowed to change its color by the work of this heating tool or cooling tool.

As the heating tool, for example, an electro-heating discoloration device equipped with a resistance heating element, a heating discoloration device loaded with hot water or the like, or a hair dryer can be suitably used; however, a friction member is preferably used as a means which enables discoloration by a simple method.

The friction member is preferably an elastic material such as an elastomer or foamed plastic, which has excellent elasticity and is capable of generating appropriate friction when rubbed and thereby producing frictional heat.

The handwriting can also be rubbed with a rubber eraser; however, since eraser crumbs are generated by the rubbing, the above-described friction member which hardly generates such crumbs is preferably used.

As the material of the friction member, for example, a silicone resin, an SEBS resin (styrene-ethylene-butadiene-styrene block copolymer) or a polyester-based resin is used.

The friction member can be combined with a writing instrument and other member having an arbitrary shape (friction body) to obtain a writing instrument set; however, excellent portability is attained by arranging the friction member on the writing instrument.

In the case of a writing instrument equipped with a cap, the position at which the friction member is arranged is not particularly restricted. For example, the cap itself can be formed by the friction member; the axial barrel itself can be formed by the friction member; when a clip is arranged, the clip itself can be formed by the friction member; or the friction member can be arranged on the front end (crown) of the cap or the rear end of the axial barrel (the part where a writing end is not arranged).

In the case of a retractable writing instrument as well, the position at which the friction member is arranged is not particularly restricted. For example, the axial barrel itself can be formed by the friction member; when a clip is arranged, the clip itself can be formed by the friction member; or the friction member can be arranged in the vicinity of an opening of the axial barrel, on the rear end of the axial barrel (the part where a writing end is not arranged), or on the knocking part.

As the cooling tool, for example, a cryogenic discoloration device utilizing a Peltier element, a cryogenic discoloration device loaded with a refrigerant such as cold water or crushed ice, a refrigerator or a freezer can be suitably used.

In cases where the liquid thermochromic color-memory composition is coated or printed, the material of the support therefor is not restricted, any material is effective. Examples thereof include paper, synthetic papers, fibers, fabrics, synthetic leathers, leathers, plastics, glass, ceramics, metals, wood and stone. The shape of the support is not restricted to a planar shape, and the support may be in an irregular shape.

By arranging a reversibly thermochromic layer containing the thermochromic color-memory composition on the support, a laminate (printed article) can be obtained.

In cases where a non-thermochromic colored layer (including an image) has been formed on the support in advance, the colored layer can be made visible or invisible depending on temperature change by applying thereto the reversibly thermochromic layer, and this enables to further diversify the mode of change.

Further, the thermochromic color-memory microcapsule pigment can also be melt-blended with a thermoplastic resin, thermosetting resin, wax or the like into the form of a pellet, powder or paste and utilized as a resin composition for thermochromic color-memory molded article. By a widely used means such as injection molding, extrusion molding, blow molding or cast molding, a molded article in the form of a three-dimensional article of an arbitrary shape, film, sheet, plate, filament, rod, pipe or the like can be obtained.

Moreover, a crayon can also be obtained by melt-blending the thermochromic color-memory microcapsule pigment into a thermoplastic resin or wax.

In the above-described liquid composition and resin composition, a conventional dye or pigment (non-thermochromic one) can also be incorporated so as to allow the liquid composition and resin composition to exhibit a discoloration behavior from a color (1) to a color (2).

By laminating a layer containing a light stabilizer and/or a transparent metallic luster pigment on a molded article obtained by molding the above-described laminate or resin composition, the light resistance of the molded article can be improved, or the durability can be improved by arranging a topcoat layer thereon.

Examples of the light stabilizer include ultraviolet absorbers, antioxidants, singlet oxygen quenchers, superoxide anion quenchers and ozone quenchers.

Examples of the transparent metallic luster pigment include pigments prepared by coating the surface of a core substance, such as natural mica, synthetic mica, glass piece, alumina or transparent film piece, with a metal oxide such as titanium oxide.

Specific examples of a product comprising the above-described thermochromic color-memory composition and thermochromic color-memory microcapsule pigment encapsulating the same are listed below.

(1) Toys:

dolls and animal-figured toys; hair of dolls and animal-figured toys; dollhouses and furnitures thereof; doll accessories such as clothes, hats, bags and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings and food articles; and the like.

(2) Clothings:

outerwears such as T-shirts, sweat shirts, blouses, dresses, swimsuits, raincoats and skiwears; footwears such as shoes and shoelaces; personal effects made of cloth, such as handkerchiefs, towels and wrapping cloths; gloves; neckties; hats; and the like.

(3) Interior Ornaments:

rugs, curtains, curtain cords, tablecloths, carpets, cushions, picture frames, imitation flowers, photo stands and the like.

(4) Furnitures:

beddings such as bedclothes, pillows and mattresses; lighting fixtures; air conditioners; and the like.

(5) Accessories:

rings, bracelets, tiaras, earrings, hair stoppers, artificial nails, ribbons, scarfs, watches, glasses and the like.

(6) Stationeries:

writing implements, stamps, erasers, celluloid boards, rulers, adhesive tapes and the like.

(7) Daily Necessaries:

cosmetics such as lipsticks, eye-shadows, manicures, hair dyes, artificial nails and paints for artificial nails; toothbrushes; and the like.

(8) Kitchen Utensils:

cups, dishes, chopsticks, spoons, forks, pots, frying pans and the like.

(9) Other Products:

various printed articles, such as calendars, labels, cards, recording materials and those for forgery prevention; books such as illustrated books; bags; packaging containers; embroidery threads; sporting gears; coasters; musical instruments; pocket warmers; refrigerants; pouch articles such as wallets; umbrellas; vehicles; buildings; indicators for temperature detection; training and learning articles; and the like.

EXAMPLES

Examples of the present invention will be described below; however, the present invention is not restricted thereto.

The methods of producing the thermochromic color-memory composition of the respective Examples and the methods of producing microcapsule pigments encapsulating the respective compositions as well as the method of measuring the hysteresis characteristics of the thermochromic color-memory compositions and microcapsule pigments based on temperature change will now be described. It is noted here that the unit "part(s)" used in the following Examples represents "part(s) by mass".

Example 1

Method of Preparing Thermochromic Color-Memory Composition

Three components composed of 1 part of 3-(2-ethoxy-4-diethylaminophenyl)-3-(1-ethyl-2-methylindol-3-yl)-4-azaphthalide as the component (a), 2 parts of 2,2-bis(4-hydroxyphenyl)hexafluoropropane as the component (b) and 50 parts of decyl 4-phenylbenzoate (Compound 1) as the component (c) were mixed, and the resultant was heated and uniformly dissolved to obtain thermochromic color-memory composition. The thus obtained thermochromic color-memory composition showed a discoloration from blue to colorless.

Preparation of Measurement Sample

The thermochromic color-memory composition was filled into a transparent glass capillary tube having an inner diameter of 1 mm and a length of 78 mm up to a height of about 10 mm from the bottom of the capillary tube, thereby preparing a measurement sample.

Measurement of Discoloration Temperature

The entire part of the thus obtained measurement sample containing the thermochromic color-memory composition was immersed in a transparent heating medium. While changing the temperature of the transparent heating medium, the discoloration state of the thermochromic color-memory composition was visually observed, and $T_1$ (complete coloration temperature), $T_2$ (coloration on-set temperature), $T_3$ (decoloration on-set temperature) and $T_4$ (complete decoloration temperature) were measured to determine $T_H$ [the middle temperature between $T_1$ and $T_2$: $(T_1+T_2)/2$], $T_G$ [the middle temperature between $T_3$ and $T_4$: $(T_3+T_4)/2$] and $\Delta H$ (hysteresis width: $T_G-T_H$).

The thermochromic color-memory composition showed the following hysteresis characteristics: $T_1=24°$ C., $T_2=26°$ C., $T_3=34°$ C., $T_4=48°$ C., $T_H=25°$ C., $T_G=41°$ C. and $\Delta H=16°$ C.

Examples 2 to 9

The thermochromic color-memory compositions of Examples 2 to 9 were prepared in the same manner as in Example 1 except that the components (a), (b) and (c) of each thermochromic color-memory composition and their amounts were changed as shown in the table below, and the discoloration temperatures were also measured in the same manner as in Example 1.

TABLE 1

| Example | Component (a) | Amount | Component (b) | Amount | Component (c) | Amount |
|---|---|---|---|---|---|---|
| 1 | A | 1 parts | E | 2 parts | decyl 4-phenylbenzoate (Compound 1) | 50 parts |
| 2 | A | 1 parts | F | 2 parts | octyl 4-biphenylacetate (Compound 23) | 50 parts |
| 3 | A | 1 parts | E | 2 parts | lauryl 4-biphenylacetate (Compound 27) | 50 parts |
| 4 | A | 1 parts | E | 2 parts | myristyl 4-biphenylacetate (Compound 29) | 50 parts |
| 5 | A | 1 parts | E | 2 parts | pentadecyl 4-biphenylacetate (Compound 30) | 50 parts |
| 6 | A | 1 parts | E | 2 parts | cetyl 4-biphenylacetate (Compound 31) | 50 parts |
| 7 | A | 1 parts | E | 2 parts | cyclohexylethyl 4-phenylbenzoate (Compound 44) | 40 parts |
|  |  |  |  |  | p-methylbenzyl stearate | 10 parts |
| 8 | A | 1 parts | E | 2 parts | cyclopentyl 4-biphenylacetate (Compound 52) | 50 parts |
|  |  |  |  |  | stearyl caprate | 3 parts |
| 9 | A | 1 parts | E | 2 parts | cyclohexylmethyl 4-biphenylacetate (Compound 55) | 50 parts |

In Table 1, "A" of the component (a) is 3-(2-ethoxy-4-diethylaminophenyl)-3-(1-ethyl-2-methylindol-3-yl)-4-azaphthalide, and "E" and "F" of the component (b) are 2,2-bis(4-hydroxyphenyl)hexafluoropropane and 1,1-bis(4-hydroxyphenyl)-2-methylpropane, respectively.

The discolorations and the values of $T_1$, $T_2$, $T_3$, $T_4$, $T_H$, $T_G$ and $\Delta H$ of the thermochromic color-memory compositions of Examples 1 to 9 are shown in the table below.

TABLE 2

| Example | Color change: coloration⇔decoloration | discoloration characteristics (° C.) | | | | | | |
|---|---|---|---|---|---|---|---|---|
|  |  | T1 | T2 | T3 | T4 | $T_H$ | $T_G$ | $\Delta H$ |
| 1 | blue⇔colorless | 24 | 26 | 34 | 48 | 25 | 41 | 16 |
| 2 | blue⇔colorless | 21 | 23 | 37 | 43 | 22 | 40 | 18 |
| 3 | blue⇔colorless | 30 | 32 | 49 | 55 | 31 | 52 | 21 |
| 4 | blue⇔colorless | 39 | 41 | 53 | 57 | 40 | 55 | 15 |
| 5 | blue⇔colorless | 42 | 44 | 59 | 65 | 43 | 62 | 19 |
| 6 | blue⇔colorless | 46 | 48 | 60 | 64 | 47 | 62 | 15 |
| 7 | blue⇔colorless | 7 | 11 | 32 | 40 | 9 | 36 | 27 |
| 8 | blue⇔colorless | 10 | 14 | 30 | 40 | 12 | 35 | 23 |
| 9 | blue⇔colorless | 15 | 19 | 60 | 70 | 17 | 65 | 48 |

Example 10

Method of Preparing Thermochromic Color-Memory Microcapsule Pigment

Thermochromic color-memory composition composed of 1 part of 3-(2-ethoxy-4-diethylaminophenyl)-3-(1-ethyl-2-methylindol-3-yl)-4-azaphthalide as the component (a), 5 parts of 2,2-bis(4-hydroxyphenyl)hexafluoropropane as the component (b) and 50 parts of lauryl 4-phenylbenzoate (Compound 3) as the component (c) was mixed and uniformly melted by heating. The resultant was further mixed with 20 parts of an aromatic polyvalent isocyanate prepolymer as a membrane wall material and 40 parts of ethyl acetate, and the resulting solution was added to 100 parts of a 15% aqueous gelatin solution and emulsion-dispersed to form microdroplets.

After continuously stirring the thus obtained dispersion at 70° C. for about 1 hour, an aqueous solution obtained by dissolving 2 parts of a water-soluble amine compound (manufactured by Mitsubishi Chemical Corporation, trade name: jER CURE U; an amine adduct of epoxy resin) in 23 parts of water was slowly added thereto with stirring, and the resultant was further continuously stirred for about 3 hours with the temperature thereof being maintained at 90° C., thereby obtaining thermochromic color-memory microcapsule pigment suspension.

From this microcapsule pigment suspension, thermochromic color-memory microcapsule pigment was isolated by centrifugation to obtain thermochromic color-memory microcapsule pigment showing a discoloration from blue to colorless (average particle size: 2.8 μm).

Preparation of Measurement Sample

Thermochromic color-memory ink was prepared by uniformly dispersing 40 parts of the thus obtained thermochromic color-memory microcapsule pigment in an aqueous ink vehicle composed of 50 parts of an ethylene-vinyl acetate resin emulsion, 1 part of a leveling agent, 1 part of an antifoaming agent, 0.5 parts of a viscosity-adjusting agent and 7.5 parts of water. A solid pattern was screen-printed using the thus obtained ink on a high-quality paper to prepare a measurement sample.

Measurement of Hysteresis Characteristics

The thus obtained measurement sample was set in the measuring section of a differential colorimeter (TC-3600 differential colorimeter, manufactured by Tokyo Denshoku Co., Ltd.). The sample portion was heated and cooled at a rate of 10° C./min to measure the brightness as the color density at each temperature and a color density-temperature curve was prepared. From this color density-temperature curve, $T_1, T_2, T_3, T_4, T_H$ [the middle temperature between $T_1$ and $T_2$: $(T_1+T_2)/2$], $T_G$ [the middle temperature between $T_3$ and $T_4$: $(T_3+T_4)/2$] and $\Delta H$ (hysteresis width: $T_G-T_H$) were determined. The thermochromic color-memory microcapsule pigment showed the following hysteresis characteristics: $T_1=-6°$ C., $T_2=0°$ C., $T_3=43°$ C., $T_4=49°$ C., $T_H=-3°$ C., $T_G=46°$ C. and $\Delta H=49°$ C.

Examples 11 to 21

The thermochromic color-memory microcapsule pigments of Examples 11 to 21 were prepared in the same manner as in Example 10 except that the components (a), (b) and (c) of each thermochromic color-memory composition encapsulated in a microcapsule and their amounts were changed to the respective compounds and amounts as shown in Table 3 below, and the hysteresis characteristics were also measured in the same manner as in Example 10.

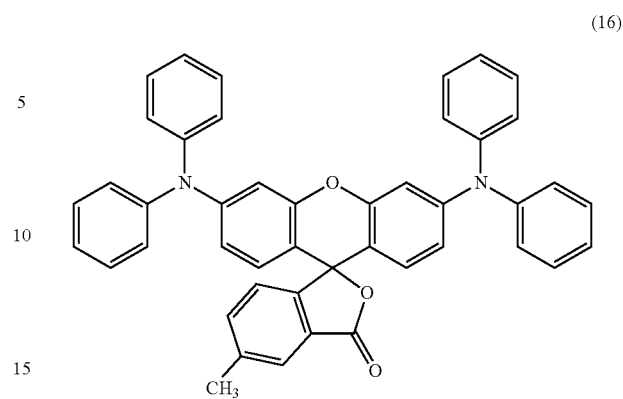

(16)

In Table 3, "E" of the component (b) is 2,2-bis(4-hydroxyphenyl)hexafluoropropane.

The discolorations and the values of $T_1, T_2, T_3, T_4, T_H, T_G$ and $\Delta H$ of the thermochromic color-memory microcapsule pigments of Examples 10 to 21 are shown in the table below.

TABLE 4

| Example | discoloration: coloration <-> decoloration | discoloration characteristics (° C.) | | | | | | |
|---|---|---|---|---|---|---|---|---|
| | | T1 | T2 | T3 | T4 | $T_H$ | $T_G$ | $\Delta H$ |
| 10 | blue <-> colorless | −6 | 0 | 43 | 49 | −3 | 46 | 49 |
| 11 | blue <-> colorless | 6 | 16 | 50 | 58 | 11 | 54 | 43 |
| 12 | blue <-> colorless- | −30 | −22 | 29 | 39 | −26 | 34 | 60 |
| 13 | blue <-> colorless | −34 | −14 | 32 | 44 | −24 | 38 | 62 |
| 14 | blue <-> colorless | −9 | −1 | 48 | 56 | −5 | 52 | 57 |
| 15 | blue <-> colorless | −9 | −1 | 43 | 53 | −5 | 48 | 53 |
| 16 | pink <-> colorless | −9 | −3 | 37 | 49 | −6 | 43 | 49 |

TABLE 3

| Example | Component (a) | Amount | Component (b) | Amount | Component (c) | Amount | Average particle size (μm) |
|---|---|---|---|---|---|---|---|
| 10 | A | 1 parts | E | 5 parts | lauryl 4-phenylbenzoate (Compound 3) | 50 parts | 2.8 |
| 11 | A | 1 parts | E | 5 parts | myristyl 4-phenylbenzoate (Compound 5) | 50 parts | 2.8 |
| 12 | A | 1 parts | E | 5 parts | hexyl 4-biphenylacetate (Compound 21) | 50 parts | 2.5 |
| 13 | A | 1 parts | E | 5 parts | octyl 4-biphenylacetate (Compound 23) | 50 parts | 0.7 |
| 14 | A | 1 parts | E | 5 parts | nonyl 4-biphenylacetate (Compound 24) | 50 parts | 2.6 |
| 15 | A | 1 parts | E | 5 parts | decyl 4-biphenylacetate (Compound 25) | 50 parts | 2.4 |
| 16 | B | 2 parts | E | 5 parts | decyl 4-biphenylacetate (Compound 25) | 50 parts | 2.6 |
| 17 | C | 3 parts | E | 5 parts | decyl 4-biphenylacetate (Compound 25) | 50 parts | 2.7 |
| 18 | A | 1 parts | E | 5 parts | lauryl 4-biphenylacetate (Compound 27) | 50 parts | 1 |
| 19 | A | 1 parts | E | 5 parts | tridecyl 4-biphenylacetate (Compound 28) | 50 parts | 2.6 |
| 20 | D | 1 parts | E | 5 parts | lauryl 4-biphenylacetate (Compound 27) | 50 parts | 1 |
| 21 | A | 1 parts | E | 5 parts | cyclohexylmethyl 4-biphenylacetate (Compound 55) p-methylbenzyl stearate | 50 parts 5 parts | 2 |

As for the component (a) shown in Table 3, "A" is 3-(2-ethoxy-4-diethylaminophenyl)-3-(1-ethyl-2-methylindol-3-yl)-4-azaphthalide, "B" is 1,2-benz-6-(N-ethyl-N-isoamylamino)fluoran, "C" is 2-(2-chloroanilino)-6-di-n-butylaminofluoran, and "D" is a fluoran compound represented by the following Formula (4):

TABLE 4-continued

| Example | discoloration: coloration <-> decoloration | discoloration characteristics (° C.) | | | | | | |
|---|---|---|---|---|---|---|---|---|
| | | T1 | T2 | T3 | T4 | $T_H$ | $T_G$ | $\Delta H$ |
| 17 | black <-> colorless | −10 | −4 | 35 | 47 | −7 | 41 | 48 |
| 18 | blue <-> colorless | −19 | −7 | 44 | 54 | −13 | 49 | 62 |

TABLE 4-continued

| Example | discoloration: coloration <-> decoloration | discoloration characteristics (° C.) | | | | | | |
|---|---|---|---|---|---|---|---|---|
| | | T1 | T2 | T3 | T4 | $T_H$ | $T_G$ | ΔH |
| 19 | blue <-> colorless | 3 | 15 | 54 | 62 | 9 | 58 | 49 |
| 20 | blue <-> colorless | −19 | −7 | 44 | 54 | −13 | 49 | 62 |
| 21 | blue <-> colorless | −18 | −12 | 42 | 66 | −15 | 54 | 69 |

Application Example 1

An ink composition 1 (printing ink) was prepared by uniformly dispersing 30 parts of the thermochromic color-memory microcapsule pigment prepared in Example 10 (which had been cooled to −6° C. or lower to develop a blue color in advance) in an aqueous ink vehicle composed of 60 parts of an acrylic resin emulsion (solid content: 45%), 1 part of a viscosity-adjusting agent, 0.2 parts of an antifoaming agent and 8.8 parts of water.

Using the thus obtained printing ink, a large number of star patterns were screen-printed on a white T-shirt (made of cotton) with a 100-mesh screen plate to obtain thermochromic color-memory T-shirt.

On this T-shirt, a large number of blue star patterns were visually recognized at room temperature (25° C.) and the star patterns were not changed by the body temperature or ambient temperature; however, when the T-shirt was heated to 49° C. or higher, the star patterns turned colorless, and they were again visually recognized when the T-shirt was cooled to −6° C. or lower.

It was possible to arbitrarily change the design of the T-shirt by decoloring some of the star patterns with heating using an iron or the like to form white void patterns in which only arbitrary stars were decolored or to form letters or patterns with the star patterns. Further, the T-shirt was able to retain such a discolored state in a room temperature range, and an arbitrary design could be again formed as described above by heating the whole T-shirt to 49° C. or higher to decolor all of the star patterns and then cooling the T-shirt to −6° C. or lower to allow all of the stars to show the color.

Application Example 2

Using an extruder, 5 parts of the thermochromic color-memory microcapsule pigment prepared in Example 11, 1 part of a dispersant, 0.1 parts of a non-thermochromic pink pigment and 93.9 parts of a polypropylene homopolymer were melted and mixed at 180° C. to obtain a resin composition for molding (pellet).

Using the thus obtained pellet, a plastic cup was molded by an injection molding machine at a cylinder temperature of 180° C.

After being cooled to 6° C. or lower, this plastic cup showed a purple color at room temperature (25° C.); however, the plastic cup started to change its color when heated to a temperature of 50° C. or higher, showing a pink color at a temperature of 58° C. or higher. When the plastic cup was cooled from this state, it started to change its color at a temperature of 16° C. or lower, again showing a purple color at a temperature of 6° C. or lower.

When hot water of 58° C. or higher was poured into the plastic cup, the plastic cup changed its color from purple to pink. When the hot water was removed from the plastic cup whose color had been changed to pink and a cold water of 6° C. or lower was poured thereinto, the plastic cup again changed its color from pink to purple.

Application Example 3

An ink composition 2 (paint) was prepared by uniformly dispersing 2.5 parts of the thermochromic color-memory microcapsule pigment prepared in Example 14 and 1.5 parts of a non-thermochromic fluorescent pink pigment in an oil-based ink vehicle composed of 12.5 parts of a vinyl chloride-vinyl acetate copolymer resin, 38.3 parts of xylene, 45 parts of butyl acetate and 0.2 parts of a viscosity-adjusting agent.

After allowing the thus obtained paint to change its color to purple by cooling it to a temperature of −9° C. or lower, the paint was spray-coated on a plug part (white) of a household electric cord to form a reversibly thermochromic layer, thereby obtaining thermochromic color-memory plug.

This plug showed a purple color at room temperature (25° C.); however, when heated, it turned pink at a temperature of 56° C. or higher. When the plug was cooled from this discolored state, it again showed a purple color at a temperature of −9° C. or lower.

Once this thermochromic color-memory plug turns pink at a temperature of 56° C. or higher, it is capable of maintaining a discolored state in pink unless it is cooled to a temperature of −9° C. or lower. This enabled to visually detect the temperature history when the plug was abnormally overheated and reached a high-temperature range of 56° C. or higher.

Application Example 4

An ink composition 3 (ink for writing instrument) was prepared by uniformly dispersing 27 parts of the thermochromic color-memory microcapsule pigment prepared in Example 15 (which had been cooled to −9° C. or lower to develop a blue color in advance) in a vehicle composed of 0.3 parts of succinoglycan (shear-thinning agent), 3.0 parts of a sugar mixture [manufactured by Sanwa Starch Co., Ltd., trade name: SANDEC 70], 0.5 parts of a phosphate-based surfactant, 0.1 parts of an antifungal agent, 1.0 part of triethanolamine and 68.1 parts of water.

Preparation of Writing Instrument

An ink-storing tube composed of a polypropylene pipe was filled by suction with the thus obtained ink for writing instrument and connected via a resin-made holder with a ballpoint pen tip holding a 0.5-mm stainless steel ball on its end.

Then, a viscoelastic ink follower (liquid plug) containing polybutene as a main component was filled from the rear end of the polypropylene pipe to obtain a ballpoint pen refill. This ballpoint pen refill was incorporated into an axial barrel to obtain a writing instrument (retractable ballpoint pen).

This writing instrument had a structure in which the ballpoint pen refill was stored inside the axial barrel with a tip provided thereon being exposed to the outside air and the tip was projected from the front-end opening of the axial barrel by the action of a clip-shaped projection-retraction mechanism (sliding mechanism) arranged on the side of the axial barrel. On the rear end of the axial barrel, a friction member made of an SEBS resin was arranged.

With the end of the ballpoint pen tip being projected from the front-end opening of the axial barrel by the action of the projection-retraction mechanism, a blue letter (handwriting) was formed by writing on a sheet of paper.

When this handwriting was rubbed with the SEBS resin-made friction member arranged on the rear end of the axial barrel, the letter was decolored to colorless, and this state could be maintained under room temperature.

Meanwhile, when the sheet of paper after the decoloration was put into a freezer and cooled to a temperature of −9° C. or lower, the letter showed a discoloration behavior of turning blue again, and this behavior was repeatedly reproducible.

Application Example 5

An ink composition 4 (printing ink) was prepared by uniformly dispersing 20 parts of the thermochromic color-memory microcapsule pigment prepared in Example 16 (which had been cooled to −9° C. or lower to develop a pink color in advance) in an aqueous ink vehicle composed of 78.0 parts of an acrylic resin emulsion (solid content: 40%) and 2.0 parts of an antifoaming agent.

Using the thus obtained printing ink, a forgery detection mark was gravure-printed on a gift certificate printed with a non-thermochromic ink on a high-quality paper. This forgery detection mark showed a pink color at room temperature (25° C.) and its color was not changed by the body temperature or ambient temperature; however, the mark turned colorless when heated to 49° C. or higher, and the mark again showed a pink color when cooled to −9° C. or lower.

Since this forgery detection mark of the gift certificate shows a pink color and does not change its color in a room temperature range, it cannot be discriminated as a forgery detection mark; however, the mark turns colorless when heated to 49° C. or higher and thus has a forgery-preventing function.

Application Example 6

An ink composition 5 (ink for writing instrument) was prepared by uniformly dispersing 27 parts of the thermochromic color-memory microcapsule pigment prepared in Example 18 (which had been cooled to −19° C. or lower to develop a blue color in advance) in an aqueous ink vehicle composed of 0.33 parts of xanthan gum (shear-thinning agent), 10.0 parts of urea, 10 parts of glycerin, 0.6 parts of a nonionic surfactant, 0.1 parts of a modified silicone-based antifoaming agent, 0.2 parts of an antifungal agent and 51.77 parts of water.

Preparation of Writing Instrument

A polypropylene pipe was filled by suction with the thus obtained ink for writing instrument and connected via a resin-made holder with a ballpoint pen tip holding a 0.5-mm stainless steel ball on its end.

Then, a viscoelastic ink follower (liquid plug) containing polybutene as a main component was filled from the rear end of the polypropylene pipe and a tail plug was fitted to the rear of the pipe. After assembling a front axial barrel and a rear axial barrel thereto and further fitting a cap, the resultant was subjected to a degassing treatment by centrifugation to prepare a writing instrument (ballpoint pen). To the back of the rear axial barrel, an SEBS rubber was attached as a friction body.

Using the thus obtained writing instrument, a blue letter (handwriting) was formed by writing on a sheet of paper. This handwriting showed a blue color at room temperature (25° C.) and, when the letter was rubbed with the friction body, the letter was decolored to colorless and this state could be maintained under room temperature.

Meanwhile, when the sheet of paper after the decoloration was put into a freezer and cooled to a temperature of −19° C. or lower, the letter showed a discoloration behavior of turning blue again, and this behavior was repeatedly reproducible.

Application Example 7

An ink composition 6 (ink for writing instrument) was prepared by mixing 25 parts of the thermochromic color-memory microcapsule pigment prepared in Example 20 (which had been cooled to −19° C. or lower to develop a blue color in advance) with 0.5 parts of hydroxyethyl cellulose, 0.2 parts of a comb-type polymeric dispersant [manufactured by Lubrizol Japan Ltd., trade name: SOLSPERSE 43000], 1.0 part of an organic nitrogen sulfur compound [manufactured by Hokko Chemical Industry Co., Ltd., trade name: HOKUSIDE R-150, a mixture of 2-methyl-4-isothiazolin-3-one and 5-chloro-2-methyl-4-isothiazolin-3-one], 0.5 parts of polyvinyl alcohol, 25.0 parts of glycerin, 0.02 parts of an antifoaming agent and 47.78 parts of water.

Preparation of Filled-in Type Writing Instrument

An ink absorbent prepared by covering a polyester sliver with a synthetic resin film was impregnated with the thus obtained ink for writing instrument and inserted into an axial barrel made of a polypropylene resin. Then, the axial barrel was assembled with a resin-processed pen body (cannonball shape) made of polyester fibers via a holder in such a manner which the front end of the axial barrel was in contact with the pen body, and a cap was further fitted thereto to obtain a writing instrument (marking pen).

On the rear end of the axial barrel, a friction member made of an SEBS resin was fitted.

Using the thus obtained writing instrument, a blue letter (handwriting) was formed by writing on a sheet of paper. This handwriting showed a blue color at room temperature (25° C.) and, when the letter was rubbed with the friction body, the letter was decolored to colorless and this state could be maintained under room temperature. Meanwhile, when the sheet of paper after the decoloration was put into a freezer and cooled to a temperature of −19° C. or lower, the letter showed a discoloration behavior of turning blue again, and this behavior was repeatedly reproducible.

Application Example 8

An ink composition 7 (ink for writing instrument) was prepared in the same manner as in Application Example 4 except that the thermochromic color-memory microcapsule pigment prepared in Example 21 (which had been cooled to −18° C. or lower to develop a blue color in advance) was used, and a writing instrument (retractable ballpoint pen) was also prepared in the same manner as in Application Example 4.

With the end of the ballpoint pen tip being projected from the front-end opening of the axial barrel by the action of the projection-retraction mechanism of the writing instrument, a blue letter (handwriting) was formed by writing on a sheet of paper.

When this handwriting was rubbed with the SEBS resin-made friction member arranged on the rear end of the axial barrel, the letter was decolored to colorless, and this state could be maintained under room temperature.

Meanwhile, when the sheet of paper after the decoloration was put into a freezer and cooled to a temperature of −18°

C. or lower, the letter showed a discoloration behavior of turning blue again, and this behavior was repeatedly reproducible.

Application Example 9

An ink composition 8 (ink for writing instrument) was prepared in the same manner as in Application Example 6 except that the thermochromic color-memory microcapsule pigment prepared in Example 21 (which had been cooled to −18° C. or lower to develop a blue color in advance) was used, and a writing instrument (ballpoint pen) was also prepared in the same manner as in Application Example 6.

Using the thus obtained ink for writing instrument, a blue letter (handwriting) was formed by writing on a sheet of paper. This handwriting showed a blue color at room temperature (25° C.) and, when the letter was rubbed with the friction body, the letter was decolored to colorless and this state could be maintained under room temperature.

Meanwhile, when the sheet of paper after the decoloration was put into a freezer and cooled to a temperature of −18° C. or lower, the letter showed a discoloration behavior of turning blue again, and this behavior was repeatedly reproducible.

Application Example 10

An ink composition 9 (ink for writing instrument) was prepared in the same manner as in Application Example 7 except that the thermochromic color-memory microcapsule pigment prepared in Example 21 (which had been cooled to −18° C. or lower to develop a blue color in advance) was used, and a writing instrument (marking pen) was also prepared in the same manner as in Application Example 7.

Using the thus obtained ink for writing instrument, a blue letter (handwriting) was formed by writing on a sheet of paper. This handwriting showed a blue color at room temperature (25° C.) and, when the letter was rubbed with the friction body, the letter was decolored to colorless and this state could be maintained under room temperature.

Meanwhile, when the sheet of paper after the decoloration was put into a freezer and cooled to a temperature of −18° C. or lower, the letter showed a discoloration behavior of turning blue again, and this behavior was repeatedly reproducible.

DESCRIPTION OF SYMBOLS $T_1$: complete coloration temperature
$T_2$: coloration on-set temperature
$T_3$: decoloration on-set temperature
$T_4$: complete decoloration temperature
ΔH: hysteresis width

The invention claimed is:
1. Thermochromic color-memory composition comprising:
(a) a component composed of an electron-donating color-developing organic compound;
(b) a component composed of an electron-accepting compound; and
(c) a reaction medium which comprises an ester compound represented by the following Formula (1) and controls color reaction between said components (a) and (b):

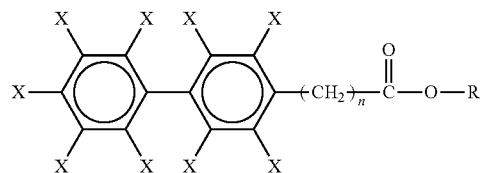

(wherein, R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms; X represents a hydrogen atom, an alkyl group having 1 to 4 carbon atoms, an alkoxy group having 1 to 4 carbon atoms or a halogen atom; and n represents 0 or 1).

2. The thermochromic color-memory composition according to claim 1, wherein said electron-donating color-developing organic compound is a compound selected from the group consisting of phthalide compounds, fluoran compounds, styrynoquinoline compounds, diazarhodamine lactone compounds, pyridine compounds, quinazoline compounds and bisquinazoline compounds.

3. The thermochromic color-memory composition according to claim 1, wherein said electron-accepting compound is a group of compounds selected from active proton-containing compounds, pseudo-acidic compounds and electron hole-containing compounds.

4. The thermochromic color-memory composition according to claim 1, wherein said ester compound represented by said Formula (1) is a compound represented by the following Formula (2) or (3):

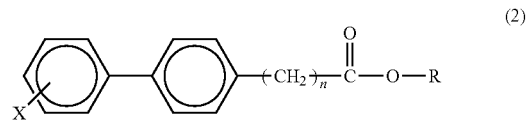

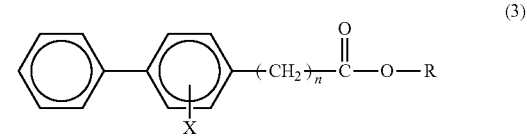

(wherein, R represents an alkyl group having 4 to 22 carbon atoms, a cycloalkylalkyl group having 5 to 12 carbon atoms, a cycloalkyl group having 4 to 8 carbon atoms or an alkenyl group having 4 to 22 carbon atoms; X represents a hydrogen atom, an alkyl group having 1 to 4 carbon atoms, an alkoxy group having 1 to 4 carbon atoms or a halogen atom; and n represents 0 or 1).

5. The thermochromic color-memory composition according to claim 1, wherein said R is selected from the group consisting of alkyl groups having 7 to 18 carbon atoms, cycloalkylalkyl groups having 5 to 11 carbon atoms, cycloalkyl groups having 5 to 8 carbon atoms and alkenyl groups having 7 to 18 carbon atoms.

6. The thermochromic color-memory composition according to claim 1, comprising said components (a), (b) and (c) at a ratio of, with respect to 1 part by mass of said component (a), 0.1 to 50 parts by mass, preferably 0.5 to 20 parts by mass, more preferably 2 to 20 parts by mass of said component (b) and 1 to 800 parts by mass, preferably 5 to 200 parts by mass, more preferably 10 to 200 parts by mass of said component (c).

7. Thermochromic color-memory microcapsule pigment comprising the thermochromic color-memory composition according to claim 1.

8. An ink composition comprising the thermochromic color-memory microcapsule pigment according to claim 7.

9. The ink composition according to claim 8, comprising said thermochromic color-memory microcapsule pigment in an amount of 5 to 40% by mass, preferably 10 to 40% by mass, more preferably 10 to 30% by mass, with respect to the total mass of said ink composition.

10. A writing instrument comprising:
   an axial barrel which stores the ink composition according to claim 8; and
   a pen body which delivers said ink composition stored in said axial barrel.

11. The writing instrument according to claim 10, wherein said pen body is a ballpoint pen body or a marking pen body.

12. The writing instrument according to claim 10, further comprising a friction member.

13. A writing instrument set comprising:
   the writing instrument according to claim 10; and
   a friction body.

* * * * *